US009189391B2

(12) United States Patent
Noborikawa et al.

(10) Patent No.: US 9,189,391 B2
(45) Date of Patent: *Nov. 17, 2015

(54) STORAGE SYSTEM AND DATA CONTROL METHOD THEREFOR

(71) Applicant: Hitachi, Ltd., Tokyo (JP)

(72) Inventors: Yoshiyuki Noborikawa, Fujisawa (JP); Shigeo Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,039

(22) Filed: Oct. 30, 2014

(65) Prior Publication Data
US 2015/0052297 A1 Feb. 19, 2015

Related U.S. Application Data

(63) Continuation of application No. 13/059,000, filed as application No. PCT/JP2011/000573 on Feb. 2, 2011, now Pat. No. 8,886,869.

(51) Int. Cl.
G06F 12/00 (2006.01)
G06F 12/02 (2006.01)
G06F 3/06 (2006.01)
G06F 11/14 (2006.01)

(52) U.S. Cl.
CPC .......... *G06F 12/0246* (2013.01); *G06F 3/0616* (2013.01); *G06F 3/0652* (2013.01); *G06F 3/0688* (2013.01); *G06F 11/1448* (2013.01); G06F 2212/7202 (2013.01)

(58) Field of Classification Search
CPC .... G06F 3/0616; G06F 3/0652; G06F 3/0688
See application file for complete search history.

(56) References Cited

U.S. PATENT DOCUMENTS

| 7,484,038 | B1 * | 1/2009 | Aiello et al. .................. 711/114 |
| 2007/0143561 | A1 | 6/2007 | Gorobets |
| 2008/0126712 | A1 | 5/2008 | Mizushima |
| 2009/0180248 | A1 | 7/2009 | Roth et al. |
| 2010/0153620 | A1 | 6/2010 | McKean et al. |
| 2010/0174804 | A1 | 7/2010 | Sonoyama |

FOREIGN PATENT DOCUMENTS

| JP | 2008-159013 | 7/2008 |
| WO | WO-2007/081638 A2 | 7/2007 |

OTHER PUBLICATIONS

PCT International Search Report and Written Opinion on application No. PCT/JP2011/000573 dated Sep. 2, 2011; 11 pages.

* cited by examiner

*Primary Examiner* — Aracelis Ruiz
(74) *Attorney, Agent, or Firm* — Foley & Lardner LLP

(57) ABSTRACT

Package controller of a flash package, upon receiving an update data write request with respect to a first logical storage area corresponding to a first LU that is treated as a backup target, manages a first physical storage area as a backup storage area in a state where pre-update data is maintained, allocates a second physical storage area to the first logical storage area, and writes the update data to the second physical storage area. The package controller, upon receiving an update data write request with respect to a second logical storage area corresponding to a second LU that is treated as a non-backup target, manages a third physical storage area allocated to the second logical storage area as an invalid storage area, and writes the update data to a fourth physical storage area newly allocated to the second logical storage area.

15 Claims, 21 Drawing Sheets

| RAID group # | FM package # |
|---|---|
| 0 | 0,1,2,3,4 |
| 1 | 5,6,7,8,9,10 |
| 2 | 11,12 |

| 1101 | 1102 | 1103 | 1104 |
|---|---|---|---|
| LU# | Logical address | Snap Shot flag | Snap Shot acquisition value |
| 0 | 0x0000~0x04FF | ON | 3 |
| 1 | 0x0500~0x05FF | OFF | 0 |
| 2 | 0x0600~0x10FF | OFF | 0 |
| 3 | 0x1100~0x11FF | ON | 1 |
| ... | ... | ... | ... |

| 1201 | 1202 |
|---|---|
| Logical page # | Physical page # |
| 0 | 500 |
| 1 | 10256 |
| 2 | 26 |
| 3 | 931 |
| ... | ... |

| Physical page # | Physical page status |
|---|---|
| 0 | Valid |
| 1 | SS |
| 2 | Free |
| 3 | Invalid |
| ... | ... |

| Physical block # | Number of deletions | Last WR time | Number of invalid pages | Physical page list |
|---|---|---|---|---|
| 0 | 1000 | 2010/10/10 15:34:26 | 998 | 0~1000 |
| 1 | 523 | 2010/7/11 21:22:02 | 300 | 1000~2000 |
| 2 | 503 | 2010/8/10 19:00:16 | 5 | 2000~3000 |
| 3 | 49 | 2010/10/27 09:37:56 | 40 | 3000~4000 |
| ... | ... | ... | ... | ... |

STORAGE SYSTEM AND DATA CONTROL METHOD THEREFOR

CROSS-REFERENCE TO RELATED PATENT APPLICATIONS

This application is a Continuation of U.S. application Ser. No. 13/059,000, now U.S. Pat. No. 8,886,869, (National Stage of PCT/JP2011/000573), filed Feb. 14, 2011, incorporated herein by reference in its entirety.

TECHNICAL FIELD

The present invention relates to a data control technology in a storage system that uses as a storage medium a flash memory, which is an electrically rewritable nonvolatile memory.

BACKGROUND ART

Compared to a HDD (Hard Disk Drive) or other such storage medium, a flash memory is characterized by the fact that it degrades significantly as the number of writes increases. A storage apparatus, which makes use of flash memory, is generally controlled so as to extend the life of the storage apparatus as long as possible even when using the flash memory by restricting the number of writes, restricting the write data size, and deleting data on a regular basis. For example, in a certain type of storage apparatus, overwriting data to a physical storage area is prohibited, and in a case where a write request for updating data has been received, control is exercised such that a new physical storage area is allocated to the request-destination logical storage area, the update data is stored in the new physical storage area, and the physical storage area in which the pre-update old data is stored is treated as an invalid area and made inaccessible from the outside.

Meanwhile, as a backup function, the storage system has a snap shot function, which stores data of a certain point in time in the past and provides a past data image.

There has been proposed a method (Patent Literature 1) in which a storage system that uses a flash memory as a storage medium utilizes the above-mentioned control by which pre-update old data is stored in the system even after update data has been stored, manages this pre-update old data as data for use in a snap shot, which maintains the association between the physical storage area in which the old data is stored and the logical storage area, and provides a past data image by using the relevant data and data that has been stored in another logical storage area with respect to which an update data write request has not been issued.

CITATION LIST

Patent Literature

[PTL 1]
Japanese Patent Application Laid-open No. 2008-159013

SUMMARY OF INVENTION

Technical Problem

In Patent Literature 1, the problem is that snap shot acquisition is carried out with respect to the entire logical storage area of the storage system even in a case where the desire is to acquire a snap shot of only a part of a logical storage area of the storage system, thereby making it necessary to manage as a snap shot a storage area that does not really require management and to continue storing unneeded old data. Furthermore, in the conventional storage system described in Patent Literature 1, the problem is that control, which includes managing the association between a logical storage area and a physical storage area, converting an address, controlling RAID, and managing a snap shot for all the storage areas of the storage system, is centralized in a single controller, thereby putting an enormous load on the controller.

Accordingly, an object of the present invention is to enable the acquisition and provision of flexible snap shots that correspond to a user's needs in a snap shot function of a storage system that uses a flash memory as the storage medium.

Another object of the present invention is to prevent the load from being concentrated on a specific controller in a storage system that uses a flash memory as the storage medium.

Solution to Problem

A storage system, which is coupled to a host apparatus, the storage system comprises the following elements, multiple flash packages each comprising multiple flash memory chips and a package controller for controlling storage areas of the multiple flash memory chips; and a storage controller that uses the storage areas of the multiple flash memory packages to provide a first LU (Logical Unit) and a second LU to the host apparatus.

when managing the first LU as a backup target and the second LU as a non-backup target, the package controller performs control so as to, upon receiving an update data write request with respect to a first logical storage area corresponding to the first LU, manage a first physical storage area allocated to the first logical storage area as a backup storage area in a state where pre-update data is maintained, newly allocate a second physical storage area to the first logical storage area, and write the update data to the second physical storage area, upon receiving an update data write request with respect to a second logical storage area corresponding to the second LU, manage a third physical storage area allocated to the second logical storage area as an invalid storage area, and write the update data to a fourth physical storage area newly allocated to the second logical storage area, use the first physical storage area that is managed as the backup storage area to provide backup data for the first LU, and delete pre-update data stored in the third physical storage area that is managed as the invalid storage area.

Advantageous Effects of Invention

According to the present invention, a flexible snap shot that corresponds to a user's needs can be acquired and provided in a snap shot function of a storage system that uses a flash memory as the storage medium. Furthermore, an object is to prevent the load from being concentrated on a specific controller in a storage system that uses a flash memory as the storage medium.

BRIEF DESCRIPTION OF DRAWINGS

FIG. 11 is a diagram showing the configuration of a snap shot management table 2410.

FIG. 12 is a diagram showing the configuration of a logical-physical conversion table 1020.

FIG. 15 is a diagram showing the configuration of a physical page status management table 1040.

FIG. 16 is a diagram showing the configuration of a physical block status management table 1050.

DESCRIPTION OF THE EMBODIMENT

An embodiment of the present invention will be explained below.

Furthermore, in the following explanation, various types of information may be explained using the expression "xxx table", but the various information may also be expressed using a data structure other than a table. To show that the various information is not dependent on the data structure, "xxx table" may be called "xxx information".

Furthermore, in the following explanation, a number will be used as the type of identification information for various targets (for example, a logical unit, a block, and a page), but other types of identification information may also be used.

Furthermore, in the following explanation, at least a portion of the processing carried out by the storage controller and FM controller described hereinbelow will be performed in accordance with a processor (for example, a CPU (Central Processing Unit)) executing a computer program. The processor may be the CPU itself or may comprise a hardware circuit that carries out either part or all of the processing performed by the processor. A program may be installed in respective controllers from a program source. The program source, for example, may be either a program delivery server or a storage medium.

Figure 1:
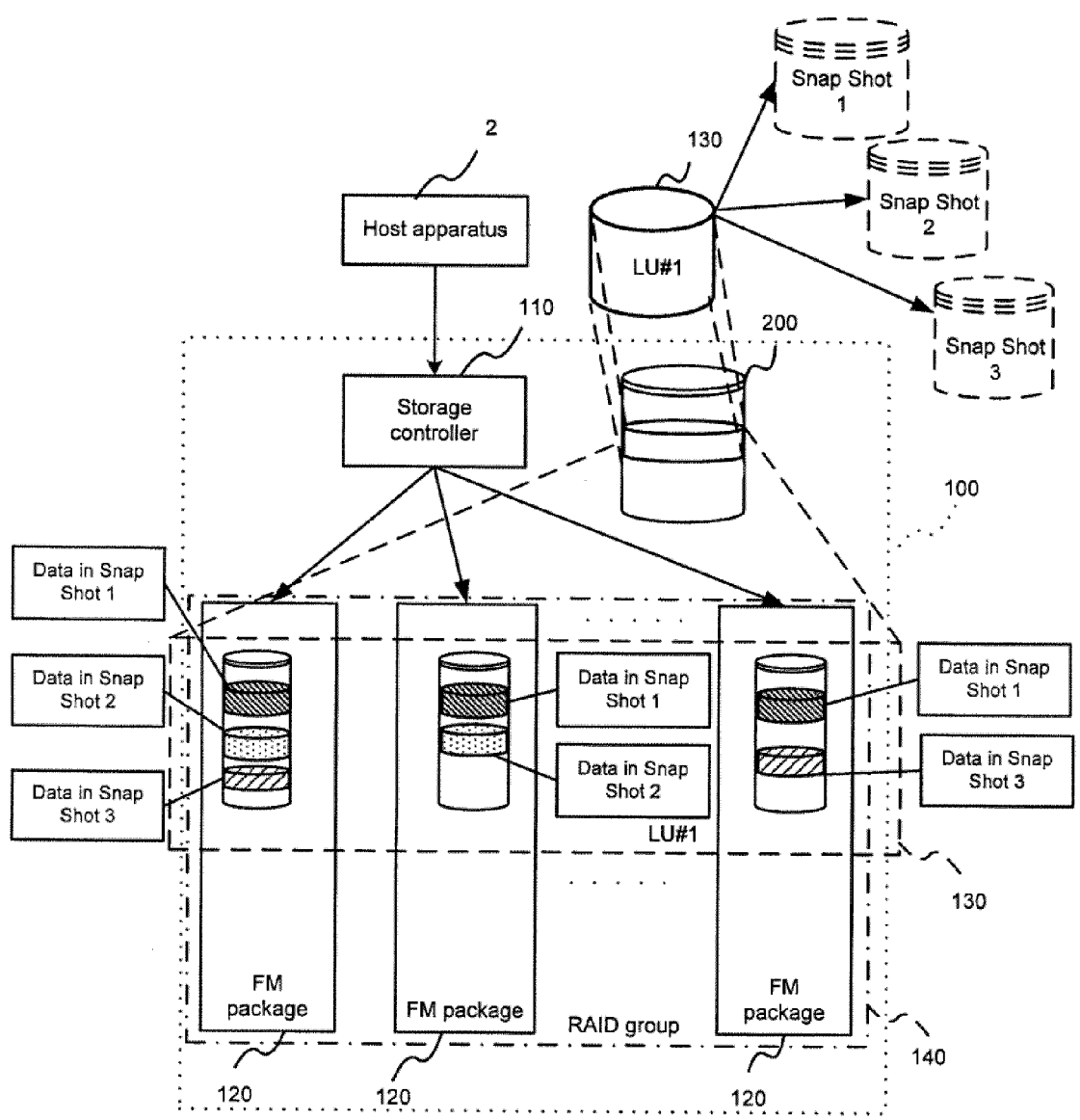
FIG. 1 is a diagram illustrating a snap shot function in an embodiment of the present invention.

An overview of this embodiment will be explained below by referring to FIGS. 1 through 3.

As in FIG. 1, a storage system 100 comprises multiple flash memory packages (called a FM package hereinafter) 120, and a storage controller 110 that is coupled to the multiple FM packages 120.

The FM package 120 comprises multiple flash memory chips (called a FM chip hereinafter). In this embodiment, the FM chip is a NAND-type FM chip, but the FM chip may be of another type. The FM chip comprises multiple physical blocks. Each physical block comprises multiple physical pages.

A RAID group 140 is configured by two or more FM packages 120 of the multiple FM packages 120 (RAID is an abbreviation for Redundant Array of Independent (or Inexpensive) Disks). The RAID group 140 may also be called a parity group. Furthermore, in this embodiment, a RAID group 140 comprises two or more FM packages 120, but a RAID group does not necessarily have to be configured. For example, a storage system may have one FM package.

The storage controller 110 forms multiple (or one) logical units (called a LU hereinafter) 130 by logically partitioning a storage space 200 provided by the RAID group 140. At least one of the multiple LUs 130 that comprise the storage space 200 is provided to a host apparatus 2 serving as a higher level apparatus of the storage system 100. In FIG. 1, LU #1 is shown as an example of the LU 130. In the following explanation, a LU 130 having a LU number n (where n is an integer) may be expressed as "LU #n".

The storage controller 110 receives an I/O command (either a write command or a read command) from the host apparatus 2. The I/O command, for example, comprises LU 130 identification information and a logical address denoting the area of this LU 130 as information showing the I/O destination. The LU 130 identification information, for example, is a LUN (Logical Unit Number). The logical address, for example, is a LBA (Logical Block Address).

The storage controller 110 receives an I/O command specifying a LU #1 from the host apparatus 2, and responds to the I/O command by writing a write-target data in the LU #1 specified by this I/O command (a write command). Or, reads a read-target data from the LU #1 specified by this I/O command (a read command). Writing the write-target data to the LU #1 refers to the write-target data being written to either one or multiple physical pages corresponding to a logical address that denotes this write destination. Furthermore, reading the read-target data from the LU #1 refers to the read-target data being read from either one or multiple physical pages corresponding to a logical address that denotes this read source.

Furthermore, this storage system 100 comprises a snap shot function as a backup function. The snap shot function is for acquiring a full backup image of a certain point in time from a LU #1 that the host apparatus 2 is capable of recognizing. For example, using the snap shot function makes it possible to restore a full backup image of the LU #1 at a prescribed point in time requested by the host apparatus 2. According to the example shown in FIG. 1, the full backup images of three different points in time on the LU #1 are being managed as snap shots 1, 2 and 3. The storage controller 110 receives a snap shot command (called a SS command hereinafter) specifying the LU #1 from the host apparatus 2, and, in response to this SS command, acquires a snap shot of the LU #1 at the point in time specified by this SS command (or the point in time that this SS command was received). Snap shot acquisition refers to a process that enables data stored in respective areas (areas denoted by respective logical addresses) comprising the LU at the time of this acquisition to be read afterwards. More specifically, pre-update data of respective areas for which updating has been carried out on or after the snap shot acquisition time is managed as difference data rather than being deleted. Then, this difference data is stored in a FM package 120, and additional information as to the point in time of the difference data is managed separately (or together) as generation information. For this reason, it is possible to know which difference data is included in which snap shot (full backup image), and to restore a snap shot of the snap shot acquisition time.

Now then, in this embodiment, as mentioned hereinabove, a NAND-type FM chip is used as the component of the FM package 120. The NAND-type FM chip comprises the following characteristic features.

(1) The read-write unit of a NAND-type FM chip is a page, and the deletion unit is a block. In the case of a write command, the write-target data is written to either one or multiple physical pages. Furthermore, in the case of a read command, the read-target data, which has been written to either one or multiple physical pages, is read. Furthermore, the write-target (or read-target) data in this case is not necessarily written to one entire (or multiple) physical page (s). There are also cases in which the write-target (or read-target) data is written to a portion of one (or multiple) physical page (s). Furthermore, the deletion of data is carried out for each block, which comprises multiple pages.

(2) The NAND-type FM chip is a recordable storage medium. A page of a NAND-type FM chip cannot be overwritten. When data is updated, the write-target data is written to a free page, and the page in which the pre-update data is stored becomes an invalid page. For this reason, a reclamation process is necessary to make effective use of the data area.

(3) The number of times that a block is deleted in a NAND-type FM chip is restricted.

(4) The NAND-type FM chip is subject to a read error in accordance with data retention. Furthermore, as used here, data retention refers to the characteristic feature of a flash memory in accordance with which data that is stored in a FM chip can only be held for a fixed period of time.

For these reasons, it is desirable that the storage system 100 carry out FM-specified processes, such as a reclamation process and a refresh process, as well as a wear-leveling process. These processes and the wear-leveling process will be explained below. In the following explanation, there may be cases where data stored in a LU is called valid data, and data not stored in a LU is called invalid data (data that became invalid subsequent to the updating of valid data). Furthermore, there may be cases where the difference data at snap shot acquisition time is called snap shot data (called SS data hereinafter). In addition, there may be cases where a page in which valid data is stored inside a FM chip is called a valid page, a page in which invalid data is stored inside a FM chip is called an invalid page, and a page in which SS data is stored inside a FM chip is called a snap shot page (called a SS page hereinafter).

The reclamation process creates a block comprising only a free page (called a free block hereinafter). Specifically, in a case where multiple valid pages exist dispersedly in multiple (or one) physical block(s), the reclamation process consolidates the valid data inside the multiple valid pages into a single physical block, creates a block comprising only an invalid page (called an invalid block hereinafter), and deletes the invalid block. A block that is targeted by the reclamation process (a RC-target block hereinafter), for example, is a block in which the number of invalid pages of the pages allocated to the block is equal to or larger than a threshold.

The refresh process moves the data of a block, for which a prescribed time or longer has elapsed, to another physical block to prevent a data retention-generated read error. In this embodiment, a block targeted by the refresh process (called a RF-target block hereinafter), for example, is a block for which the elapsed time period since the last write time has exceeded a threshold. However, a refresh process-targeted block is not limited to a block for which the elapsed time period since the last write time has exceeded a threshold, and, for example, may be a block for which the elapsed time from a prescribed operation has exceeded a threshold, such as a block for which the elapsed time since the first write time is equal to or greater than a threshold.

The wear-leveling process is for equalizing the number of deletions (or the number of writes (the same holds true hereinbelow)) for each block inside a FM chip. Specifically, the wear leveling process, for example, allocates a page of a block in which the number of deletions is less than a threshold in a case where a write is to be carried out to a page inside a flash memory to equalize the number of deletions for each block.

In this embodiment, the above-described processes (the reclamation process, the refresh process, and the wear-leveling process) are carried out for each FM package by a controller (called a FM controller hereinafter) inside each FM package, which will be explained further below. Furthermore, a SS data save process, which will be explained below, is similarly carried out by the respective FM controllers. An overview will be explained below.

Figure 2:
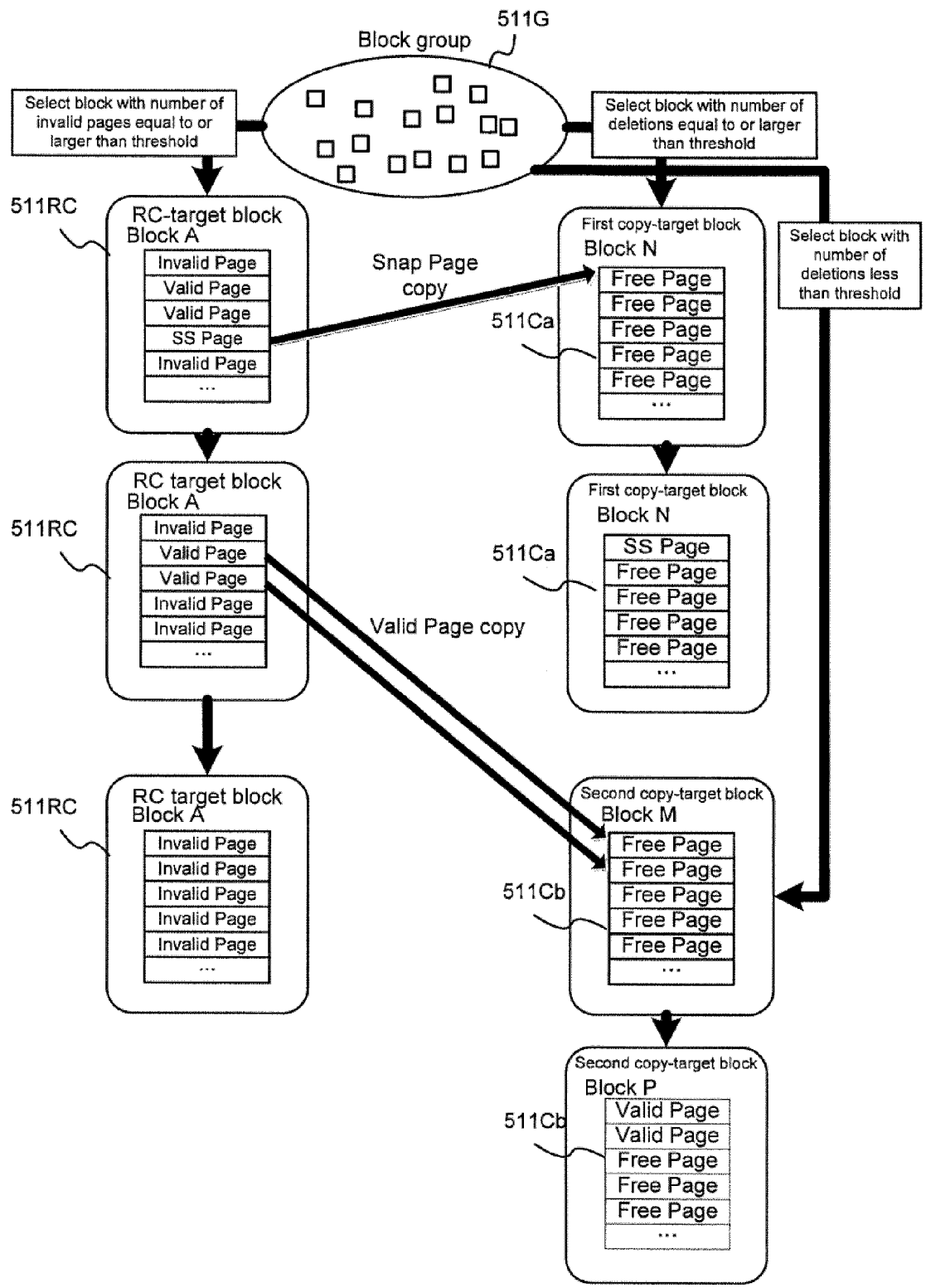
FIG. 2 is a diagram illustrating an overview of a reclamation process in the embodiment of the present invention.

FIG. 2 is a diagram illustrating an overview of a SS data save process during the execution of a reclamation process in this embodiment. Furthermore, in the following explanation, "delete a block" specifically will signify the creation of a free block by carrying out a deletion process with respect to a block.

The processing carried out by the FM controller will be described below.

The FM controller carries out the reclamation process. The FM controller carries out a SS data save process as a pre-process for carrying out the reclamation process in a case where there is a SS page inside the RC-target block 511RC. Specifically, the FM controller selects from among the group of blocks 511G inside the FM package a block for which the number of invalid pages is equal to or larger than a threshold as the RC-target block 511RC. The FM controller determines whether or not a SS page exists inside the selected RC-target block 511RC. In a case where a SS page exists, the FM controller carries out the following SS data save process.

(A) The FM controller selects, from among the block group 511G inside the FM package, a block whose number of deletions is equal to or larger than a threshold (called the first copy-target block hereinafter) 511Ca.

(B) The FM controller carries out the following processes (b1) and (b2) for each of one or more SS pages in the RC-target block 511RC.

(b1) The FM controller copies the SS data in the SS page to a free page inside the first copy-target block.

(b2) The FM controller changes the copy-source SS page to an invalid page, and changes the copy-destination free page to a SS page.

It is obvious that using the SS data save process to create a SS page in the first copy-target block results in the update write to the SS page not being carried out with respect to the block (the first copy-target block) whose number of deletions was equal to or larger than the threshold, thereby making it possible to maintain the number of deletions.

The FM controller carries out a reclamation process for a RC-target block that does not have a SS page (specifically, a RC-target block that lost the SS page in accordance with the SS data save process being carried out and/or a RC-target block in which a SS page does not exist even though the SS data save process has not been carried out). The reclamation process will be explained hereinbelow.

(F) The FM controller selects, from among the block group 511G inside the FM package, a block whose number of deletions is less than a threshold (called the second copy-target block hereinafter) 511Cb.

(G) The FM controller determines whether or not one or more valid pages exist in the RC-target block 511RC.

(H) In a case where the result of the determination in the above-mentioned (G) is affirmative, the FM controller carries out the below-described (h1) and (h2) for each valid page.

(h1) The FM controller copies the valid data of the valid page to a free page of the second copy-target block.

(h2) The FM controller changes the copy-source valid page to an invalid page, and changes the copy-destination free page to a valid page.

(I) The FM controller deletes the RC-target block for which all the pages have become invalid pages, thereby creating a free block.

Using the reclamation process to increase the valid pages in the second copy-target block makes it possible to increase the probability of deleting a block whose number of deletions is less than the threshold.

Figure 3:
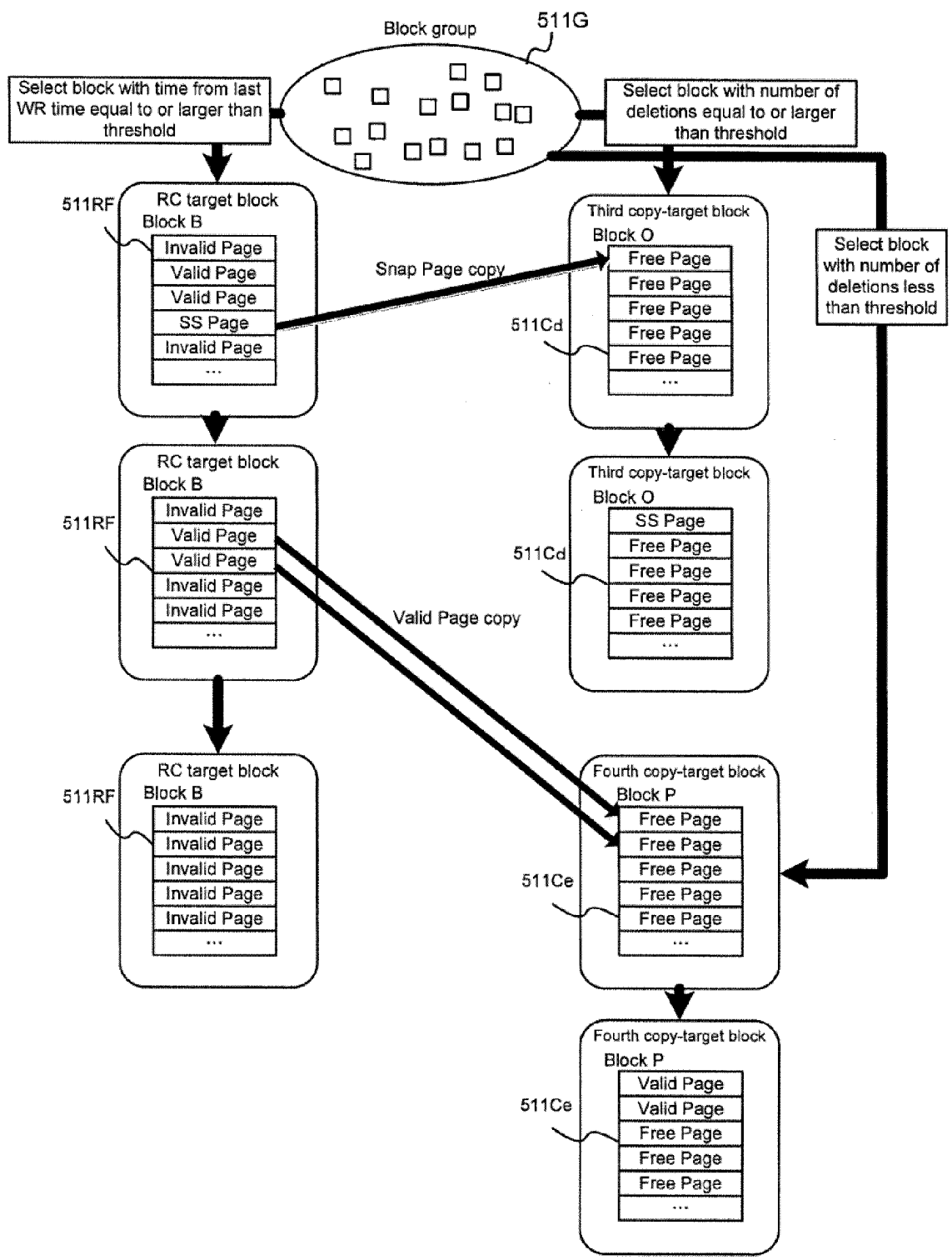
FIG. 3 is a diagram illustrating an overview of a refresh process in the embodiment of the present invention.

FIG. 3 is a diagram illustrating an overview of a SS data save process during a refresh process in this embodiment. Furthermore, in the following explanation, "delete a block" specifically will signify the creation of a free block by carrying out a deletion process with respect to a block.

The processing carried out by the FM controller will be described below.

The FM controller carries out the refresh process. The FM controller carries out a SS data save process as a pre-process for carrying out the refresh process in a case where there is a SS page inside an RF-target block 511RF. Specifically, the FM controller selects, from among the group of blocks 511G inside the FM package, a block for which the elapsed time period from the last write time (the difference time from the last write time to the present time) is equal to or larger than a threshold as the RF-target block 511RF. The FM controller determines whether or not a SS page exists inside the selected RF-target block 511RF. In a case where a SS page exists, the FM controller carries out the following SS data save process.

(J) The FM controller selects, from among the block group 511G inside the FM package, a block whose number of deletions is equal to or larger than a threshold (called the third copy-target block hereinafter) 511Cd.

(K) The FM controller carries out the following processes (b1) and (b2) for each of one or more SS pages in the RF-target block 511RF.

(k1) The FM controller copies the SS data in the SS page to a free page inside the third copy-target block 511Cd.

(k2) The FM controller changes the copy-source SS page to an invalid page, and changes the copy-destination free page to a SS page.

It is obvious that using the SS data save process to create a SS page in the third copy-target block 511Cd results in the update write to the SS page not being carried out with respect to the block (the third copy-target block) whose number of deletions was equal to or larger than the threshold, thereby making it possible to maintain the number of deletions.

The FM controller carries out the refresh process for a RF-target block that does not have a SS page (specifically, a RF-target block that lost the SS page in accordance with the SS data save process being carried out and/or a RF-target block in which a SS page does not exist even though the SS data save process has not been carried out). The refresh process will be explained hereinbelow.

(L) The FM controller selects, from among the block group 511G inside the FM package, a block whose number of deletions is less than a threshold (called the fourth copy-target block hereinafter) 511Ce.

(M) The FM controller determines whether or not one or more valid pages exist in the RF-target block 511RF.

(N) In a case where the result of the determination in the above-mentioned (M) is affirmative, the FM controller carries out the below-described (n1) and (n2) for each valid page.

(n1) The FM controller copies the valid data of the valid page to a free page of the fourth copy-target block.

(n2) The FM controller changes the copy-source valid page to an invalid page, and changes the copy-destination free page to a valid page.

(O) The FM controller deletes the RF-target block for which all the pages have become invalid pages, thereby creating a free block.

Using the refresh process to increase the valid pages in the fourth copy-target block makes it possible to increase the probability of deleting a block whose number of deletions is less than the threshold.

This embodiment will be explained in detail below by referring to the drawings.

Figure 4:
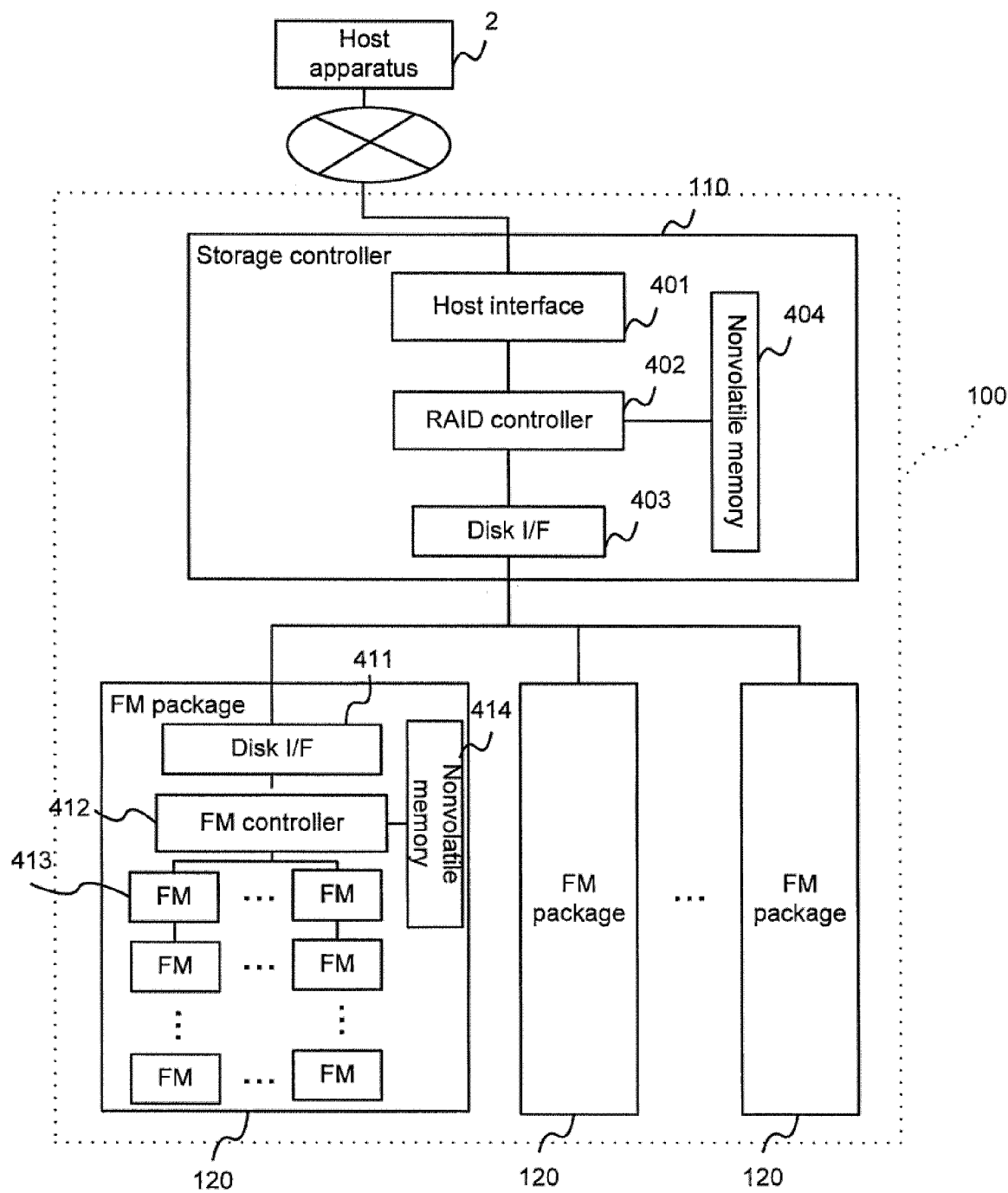
FIG. 4 is a diagram showing a configuration of an information processing system related to the embodiment of the present invention.
Figure 5:
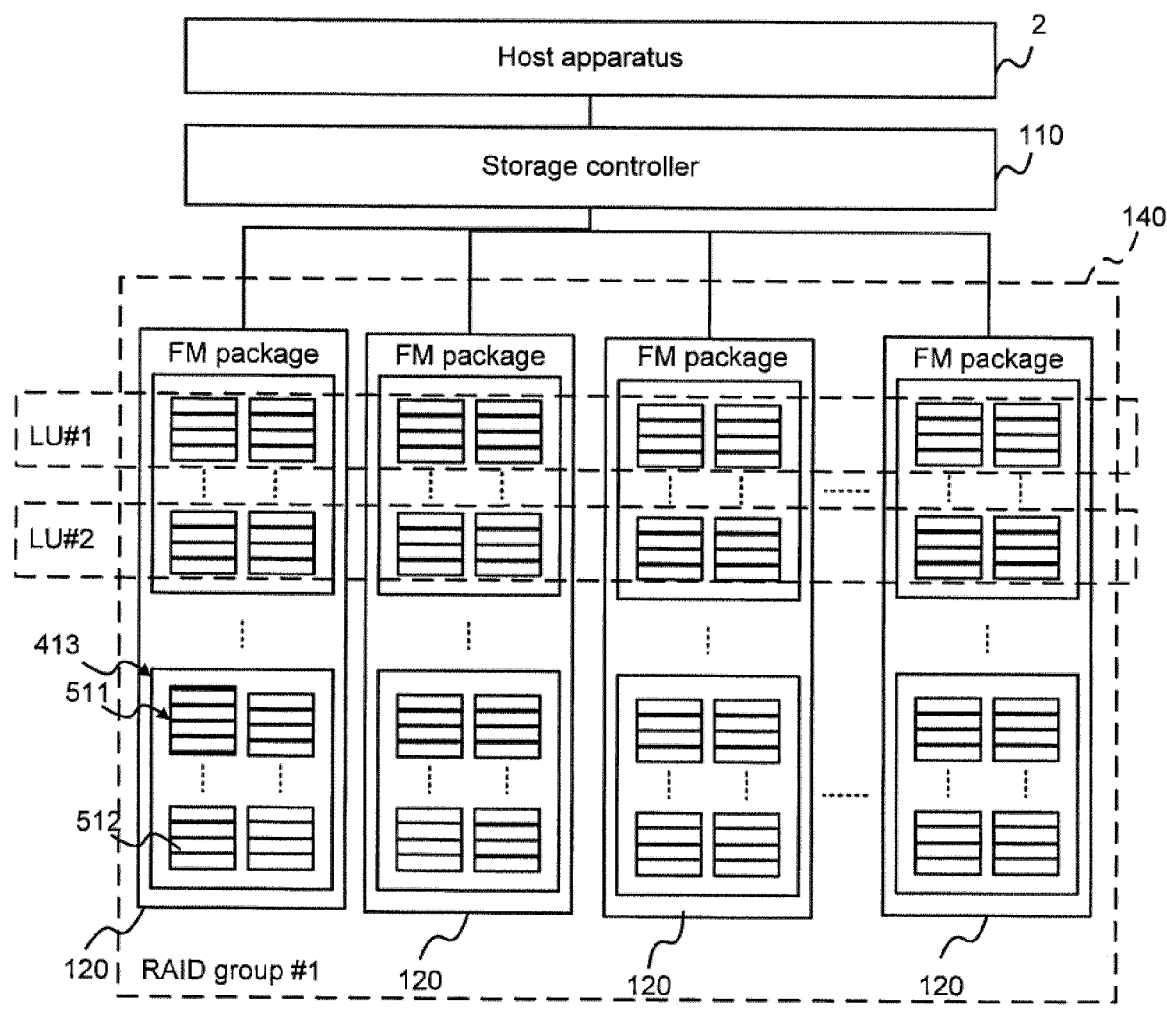
FIG. 5 is a diagram showing details of a FM chip 413 inside a FM package 120.

First of all, the configuration of the storage system related to this embodiment will be explained by referring to FIGS. 4 and 5. FIG. 4 is a block diagram of the storage system 100. FIG. 5 is a diagram showing details of an FM chip 413 inside an FM package 120.

The storage system 100 comprises multiple FM packages 120, and a storage controller 110 that is coupled to a host apparatus 2 and the multiple FM packages 120. The storage controller 110 carries out data I/O with respect to one or more FM packages 120 of the multiple FM packages 120 in accordance with an I/O command from the host apparatus 2.

The storage controller 110 comprises a host interface (host I/F hereinafter) 401, a RAID controller 402, a nonvolatile memory 404, and a disk interface (called the disk I/F hereinafter) 403. The host I/F 401 is coupled to the host apparatus 2. The disk I/F 403 is coupled to the respective FM packages 120. The RAID controller 402 is coupled to the host I/F 401, the disk I/F 403, and the nonvolatile memory 404.

The nonvolatile memory 404 stores data and a program. The data stored in the nonvolatile memory 404 will be described further below.

The RAID controller 402 comprises a microprocessor (not shown in the drawing) for executing the program inside the nonvolatile memory 404. The RAID controller 402 receives an I/O command from the host apparatus 2 via the host I/F 401, and, in accordance with this I/O command, issues the data of the I/O command to one or more FM packages 120 via the disk I/F 403.

Each FM package 120 comprises a flash memory controller (called the FM controller hereinafter) 412, multiple NAND-type FM chips 413 coupled thereto, a nonvolatile memory 414, and a disk I/F 411.

The nonvolatile memory 414 stores data and a program. The data stored in the nonvolatile memory 414 will be described further below.

The FM controller 412 carries out a data I/O with respect to one or more FM chips 413 of the multiple FM chips 413 in accordance with an I/O command from the storage controller 110. The FM controller 412 comprises a microprocessor (not shown in the drawing) for executing a program inside the nonvolatile memory 414 of the FM package 120 that comprises this FM controller 412.

Each FM chip 413 inside the FM package 120 is coupled to the FM controller 412 inside this FM package 120. Each FM chip 413 comprises multiple physical blocks 511. Each physical block 511 comprises multiple physical pages 512 (Refer to FIG. 5).

As explained above, a RAID group is configured by two or more FM packages 120 inside the storage system 100. Multiple (or one) LU(s), which is/are logically partitioned, is/are formed based on one RAID group. In FIG. 5, LU #1 and LU #2 are formed based on the RAID group #1. A logical address is allocated to each area comprising the LU.

In the following explanation, for each area comprising the LU, there is a first logical address viewed from the side of the host apparatus 2, and a second logical address viewed from the sides of the storage controller 110 and the FM controller 120.

Figures 6, 7:
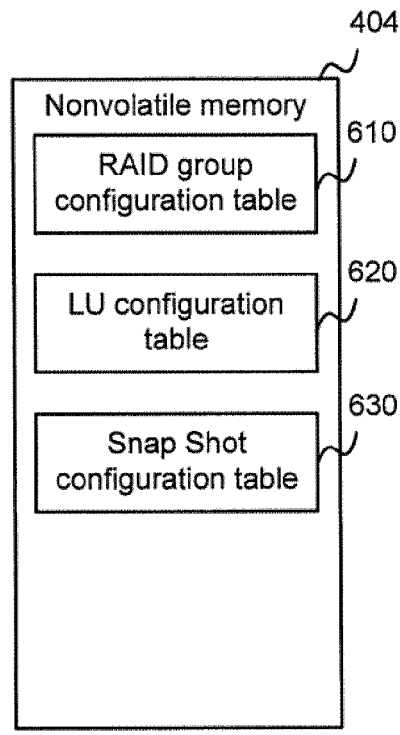
FIG. 6 is a diagram showing multiple tables stored in a nonvolatile memory 404.
FIG. 7 is a diagram showing the configuration of a RAID group configuration table 610.

FIG. 6 is a diagram showing multiple tables that are stored in the nonvolatile memory 404 of the storage controller 110.

The nonvolatile memory 404, as multiple tables, for example, the nonvolatile memory 404 stores a RAID group configuration table 610, a LU configuration table 620, and a snap shot configuration table 630. At least one of these tables may be created after operating the storage system 100. The tables inside the nonvolatile memory 404 will be explained below.

FIG. 7 shows the configuration of the RAID group configuration table 610.

The RAID group configuration table 610 shows the FM package 120 that configures each RAID group 140. Specifically, the table 610 comprises the following information for each RAID group:
 a RAID group number 701, which is the number of the RAID group; and
 a FM package number 702, which is the number of an FM package that belongs to the RAID group.

According to the example shown in the drawing, it is clear that five FM packages 120, i.e., FM packages #0, 1, 2, 3, 4 belong to the RAID group #1.

Figure 8:
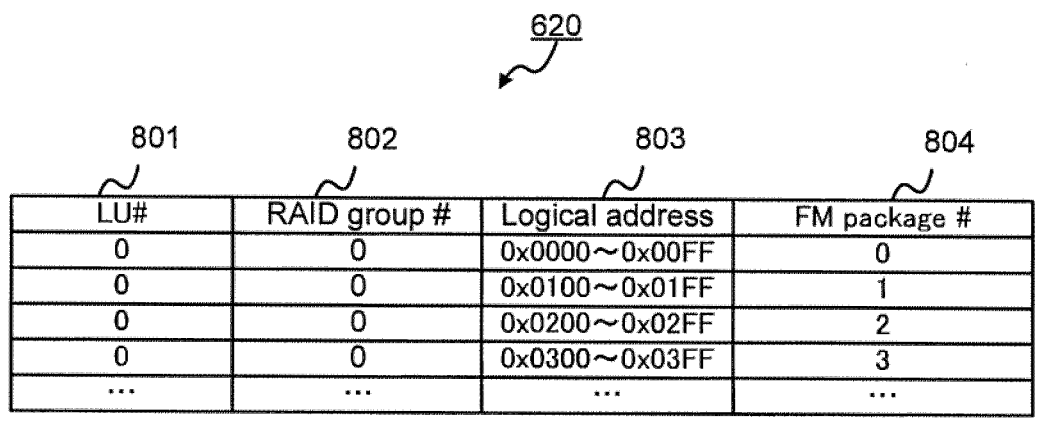
FIG. 8 is a diagram showing the configuration of a LU configuration table 620.

FIG. 8 shows the configuration of the LU configuration table 620.

The LU configuration table 620 shows the configuration of each LU. Specifically, the table 620, for example, comprises the following information for each LU part:
 a LU number 801, which is the number of the LU comprising the LU part;
 a RAID group number 802, which is the number of the RAID group that constitutes the basis of the LU part;
 a logical address range 803, which is the range of second logical addresses allocated to the LU part; and
 a FM package number 804, which is the number of the FM package that constitutes the basis of the LU part.

According to the example shown in the drawing, it is clear that a first part of the LU #0 (the part comprising the top of the LU #0) is based on the FM package #0 inside the RAID group #0, and that 0X0000 through 0X00FF are allocated to this first part as the second logical address range. Furthermore, it is clear that a second part of the LU #0 (the next part after the first part of the LU #0) is based on the FM package #1 inside the RAID group #0, and that 0X0100 through 0X01FF are allocated to this second part as the second logical address range. Therefore, according to the example of this drawing, in a case where the first part of the LU #0 is the I/O destination, the I/O is only carried out with respect to the FM package #0 of the RAID group #0, and in a case where the second part of the LU #0 is the I/O destination, the I/O is only carried out with respect to the FM package #1 of the RAID group #0. That is, in this embodiment, the data in the RAID group #0 is not dispersedly written to the five FM packages #0 through #4 that comprise the RAID group #0.

Figure 9:
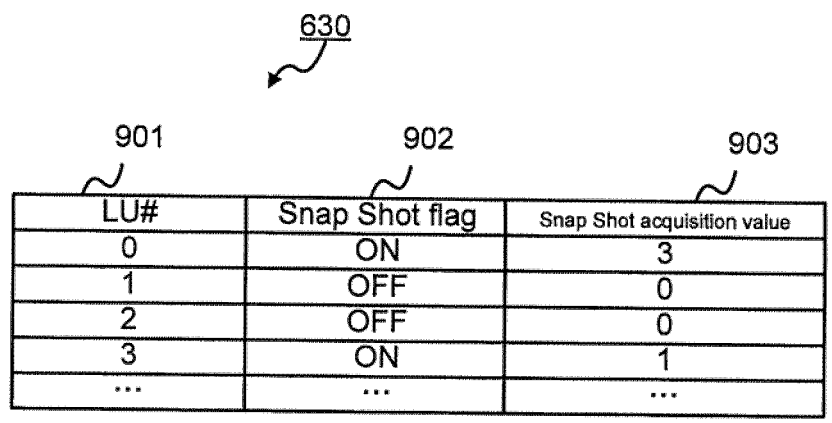
FIG. 9 is a diagram showing the configuration of a snap shot configuration table 630.

FIG. 9 shows the configuration of the snap shot configuration table 630.

The snap shot configuration table 630 shows information related to the snap shot of each LU. Specifically, the table 630, for example, comprises the following information for each LU:
 a LU number 901, which is the number of the LU;
 a snap shot flag 902, which denotes whether LU snap shot acquisition is (ON) or (OFF); and
 a snap shot acquisition value 903, which denotes the number of snap shots that have been acquired for a LU.

According to the example of this drawing, it is clear that for LU #0 the snap shot flag 902 is "ON" and a snap shot is to be acquired, and, in addition, that three snap shots have been acquired. Further, it is clear that for LU #1 the snap shot flag 902 is "OFF" and a snap shot is not to be acquired, and, in addition, that zero snap shots have been acquired.

Figure 10:
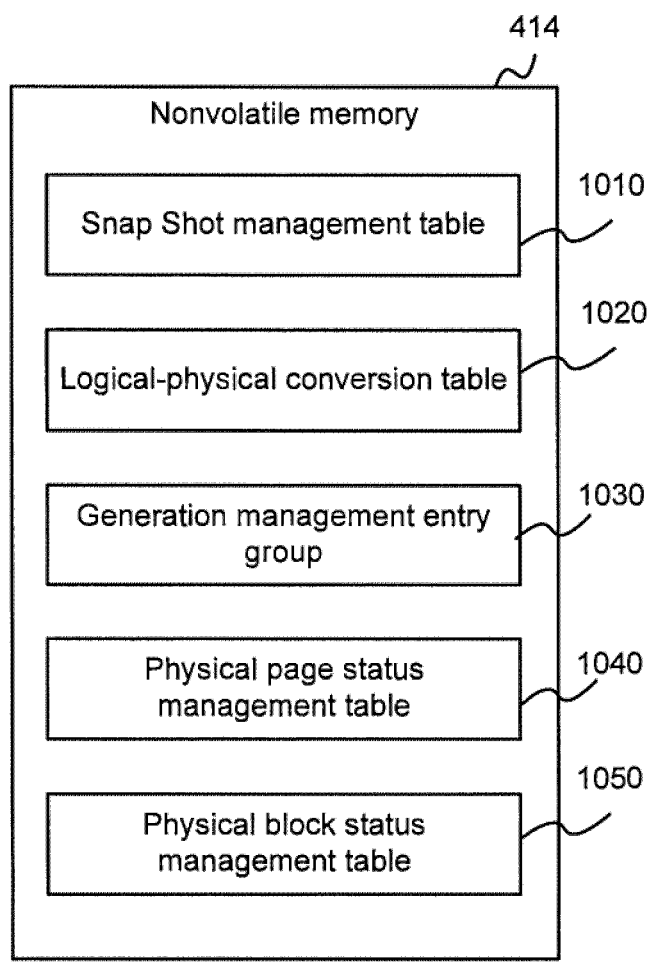
FIG. 10 is a diagram showing multiple tables stored in a nonvolatile memory 414.

FIG. 10 is a diagram showing multiple tables stored in the nonvolatile memory 414 of each FM package 120.

The nonvolatile memory 414, for example, stores as multiple tables a snap shot management table 1010, a logical-physical conversion table 1020, a generation management entry group 1030, a physical page status management table 1040, and a physical block status management table 1050. At least one of these tables may be created after the storage system 1 is operating. The tables inside the nonvolatile memory 414 will be explained hereinbelow.

FIG. 11 shows the configuration of the snap shot management table 1010.

The snap shot management table 1010 shows information related to a snap shot provided to the FM package 120. Specifically, for example, the table 1010 comprises the following information for each LU:
 a LU number 1101, which is the number of the LU;
 a logical address 1102, which denotes a range of LU second logical addresses;
 a snap shot flag 1103, which denotes whether LU snap shot acquisition is (ON) or (OFF); and
 a snap shot acquisition value 1104, which denotes the number of snap shots that have been acquired for the LU.

According to the example of this drawing, it is clear that for the LU #1, the second logical address is the range 0X0000 through 0X04FF, the snapshot flag is "ON" and a snap shot is to be acquired, and, in addition, three snap shots have been acquired.

FIG. 12 shows the configuration of the logical-physical conversion table 1020.

The logical-physical conversion table 1020 shows the corresponding relationship between a logical page and a physical page. Specifically, the table 1020, for example, comprises the following information for each logical page:
 a logical page number 1201, which is the number of the logical page; and
 a physical page number 1202, which is the number of the physical page associated with the logical page.

According to the example of this drawing, it is clear that a physical page #500 is associated with the logical page #0. Furthermore, although not shown in the drawing, the logical page is associated with the second logical address.

Figure 13:
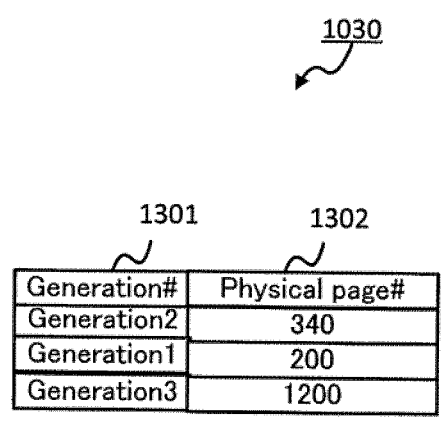
FIG. 13 is a diagram showing the configuration of a generation management entry group 1030.

FIG. 13 shows the configuration of the generation management entry group 1030.

The generation management entry group 1030 is an aggregate of one or more entries (the generation management entry hereinafter) denoting the generation of a snap shot. Each generation management entry group, for example, comprises a generation number 1301, which is the number denoting the generation of a snap shot, and a physical page number 1302, which is the number of the physical page that stores the SS data comprising the snap shot of this generation.

Figure 14:
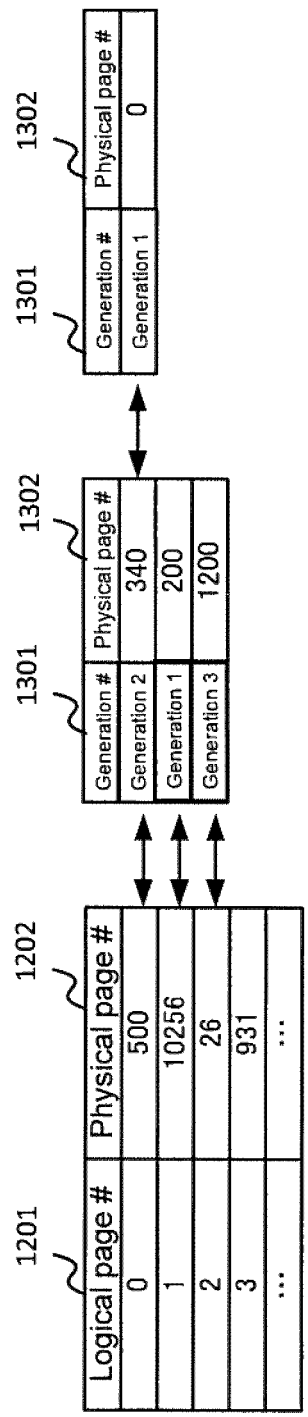
FIG. 14 is a schematic diagram showing the corresponding relationship between the logical-physical conversion table 1020 and a generation management entry.

As shown in FIG. 14, the generation management entry is related via a queue format to the entry (the logical-physical entry hereinafter) that comprises the logical-physical conversion table 1020. The number of generation management entries related to the logical-physical entry corresponding to this logical page increases each time the generation of the SS data stored in the logical page increases. For example, in FIG. 14, it is supposed that the generation management entry corresponding to generation #1 is related to the logical-physical entry corresponding to the logical page #0. In accordance with this, it is supposed that the generation #2 SS data, which was stored in the logical page #0, is stored in the physical page #340. In this case, the generation management entry corresponding to the generation #2 (the entry comprising generation number 1301 "Generation 2" and physical page number 1302 "340") is related to the logical-physical entry corresponding to the logical page #0, and the existing generation management entry (the entry comprising generation number 1301 "Generation 1" and physical page number 1302 "0") is related to this generation management entry.

FIG. 15 shows the configuration of the physical page status management table 1040.

The physical page status management table 1040 shows the status of the physical page. Specifically, the table 1040, for example, comprises the following information for each physical page:
- a physical page number 1501, which denotes the number of the physical page; and
- a physical page status 1502, which denotes the status of the physical page.

According to the example of this drawing, it is clear that the physical page #1 is a valid page, the physical page #2 is a SS page, the physical page #3 is a free page, and the physical page #4 is an invalid page. Furthermore, the free page is a physical page in which data is not being stored.

FIG. 16 shows the configuration of the physical block status management table 1050.

The physical block status management table 1050 shows the status of a physical block. Specifically, the table 1050, for example, comprises the following information for each physical block:
- a physical block number 1601, which is the number of the physical block;
- a number of deletions 1602, which denotes the number of times that a physical block has been deleted;
- a last write time 1603, which denotes the time when data was last written to a physical page inside the physical block;
- an invalid page number 1604, which denotes the number of invalid pages of the physical block; and
- a physical page list 1605, which shows a list of physical page numbers from the number of the first physical page to the number of the last physical page of the physical block.

According to the example of this drawing, it is clear that the physical block #0 has been deleted 1000 times up until present, the last time that data was stored in a page inside this physical block was "2010/10/10/15:34:26", and there are 998 invalid pages. Furthermore, it is clear that the physical block #0 comprises physical pages numbers 0 through 1000.

Next, the various types of processing carried out by the storage system 100 related to this embodiment will be explained.

Figure 17:
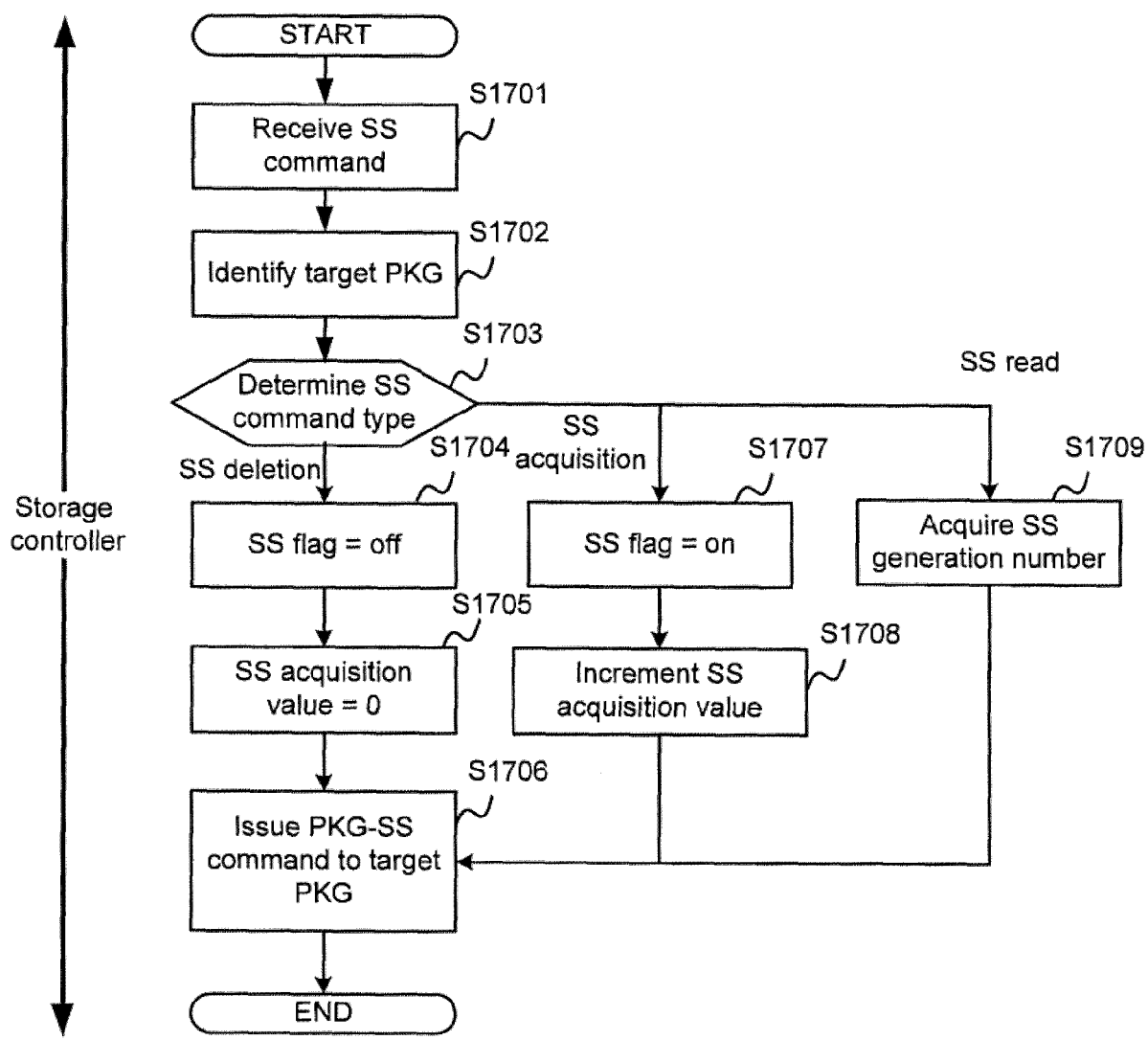
FIG. 17 is a flowchart showing a storage controller 110 snap shot process.

FIG. 17 shows a storage controller 110 snap shot process. In the following explanation, a snap shot may be abbreviated as "SS".

The storage controller 110 receives a SS command from the host apparatus 2 (S1701).

There are multiple types of SS commands. The multiple types of SS commands, for example, are a SS acquisition command (a command for acquiring a SS), a SS deletion command (a command for deleting a SS), and a SS read command (a command for reading data from a SS). The multiple types of SS command may also include a SS write command (a command for writing data to a SS).

At the least, a LU is specified in a SS command. Specifically, for example, all of the SS acquisition command, the SS deletion command, and the SS read command comprise a LU number, which constitutes the source of the SS. The SS read command additionally comprises a SS generation number and a first logical address corresponding to the area in which the read-target data is stored. In the explanation of FIG. 17, the LU specified in the SS command will be called the "target LU".

The storage controller 110, based on a SS command, identifies a FM package (PKG) that will be the destination of a PKG-SS command (S1702). Specifically, for example, the storage controller 110 identifies the FM package corresponding to the target LU from the LU configuration table 620. In a case where the SS command comprises a first logical address, the storage controller 110 identifies the second logical address corresponding to the first logical address based on the target LU number, and identifies the FM package corresponding to this LU number and this second logical address from the LU configuration table 620. The identified FM package is the destination of the PKG-SS command. The PKG-SS command is the SS command that is sent to the FM package.

The storage controller 110 determines the type of SS command (S1703). In a case where the type of SS command is a SS deletion, the storage controller 110 carries out the processing of S1704 and S1705. In a case where the type of SS command is a SS acquisition, the storage controller 110 carries out the processing of S1707 and S1708. In a case where the type of SS command is a SS read, the storage controller 110 carries out the processing of S1709.

A case in which the SS command type is a SS deletion will be explained hereinbelow.

In a case where the SS command type is determined to be a SS deletion in S1703, the storage controller 110 cancels the snap shot acquisition with respect to the target LU (S1704). Specifically, the storage controller 110 changes the snap shot flag 902 in the snap shot configuration table 630 corresponding to the LU number of the SS command to "OFF".

Next, the storage controller 110 invalidates all of the snapshots with respect to the target LU (S1705). Specifically, the storage controller 110 changes the snap shot acquisition value 902 in the snap shot configuration table 630 corresponding to the LU number of the SS command to "0". Next, the storage controller 110 carries out S1706.

A case in which the SS command type is a SS acquisition will be explained below.

In a case where the SS command type is determined to be a SS acquisition in S1703, the storage controller 110 updates the snap shot acquisition with respect to the target LU (S1707). Specifically, the storage controller 110 changes the snap shot flag 902 of the snap shot configuration table 630 corresponding to the target LU to "ON".

Next, the storage controller 110 increases by 1 the snap shot acquisition value 902 in the snap shot configuration table 630 corresponding to the target LU (S1708). That is, the number of snap shots of the target LU increase by 1 each time a SS acquisition command is received. S1706 is carried out next.

A case in which the SS command type is a SS read will be explained hereinbelow.

In a case where the SS command type is determined to be a SS read in S1703, the storage controller 110 acquires the generation number configured in the SS command (S1708). S1706 is carried out next.

The processing of S1706 will be explained. The storage controller 110 creates a SS command-based PKG-SS command, and sends this PKG-SS command to the FM package 120 identified in S1502. PKG-SS command types, for example, include SS deletion, SS acquisition, and SS read the same as the SS command.

Information included in the PKG-SS command to be issued will differ in accordance with the SS command type determined in S1703. In cases where the SS command type is SS deletion and SS acquisition, a LU number is included in the PKG-SS command. In a case where the SS command type is SS read, a second logical address and a generation number are also included in the PKG-SS command.

Figure 18:
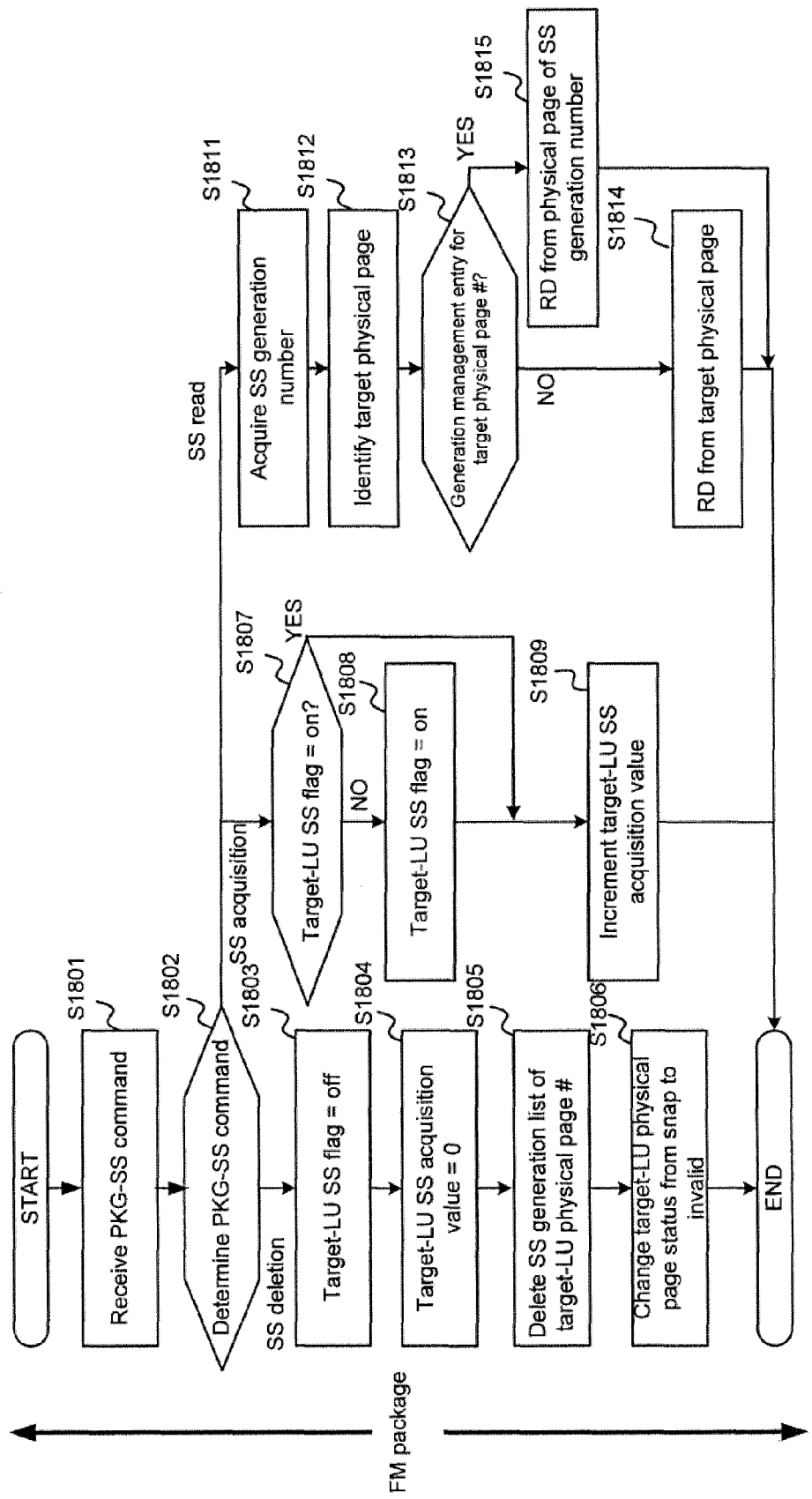
FIG. 18 is a flowchart showing a FM package 120 snap shot process.

FIG. 18 shows a FM package 120 snap shot process.

The FM package 120 receives a PKG-SS command from the storage controller 110 (S1801). In the explanation of FIG. 18, the LU specified in the PKG-SS command will be called the "target LU". The target LU in FIG. 18 is the same as the target LU in FIG. 17.

The FM controller 412 determines the type of the received PKG-SS command (S1802). Specifically, the FM controller 412 determines whether the PKG-SS command type is a SS deletion, a SS acquisition, or a SS read.

In a case where the result of the determination is that the SS command type is a SS deletion, the FM controller 412 carries out the processing of S1803 through S1806. In a case where the SS command type is a SS acquisition, the FM controller 412 carries out the processing of either S1807 through S1809 or S1807 and S1809. In a case where the SS command type is a SS read, the FM controller 412 carries out the processing of either S1811 through S1814 or S1811 through S1813 and S1815.

A case in which the PKG-SS command type is a SS deletion will be explained hereinbelow.

In a case where the SS command type is determined to be a SS deletion in S1802, the FM controller 412 cancels the snap shot acquisition with respect to the target LU (S1803). Specifically, the FM controller 412 changes the snap shot flag 1103 in the snap shot management table 1010 corresponding to the target LU to "OFF".

Next, the FM controller 412 invalidates all of the snap shots with respect to the target LU (S1804). Specifically, the FM controller 412 changes the snap shot acquisition value 1104 in the snap shot management table 1010 corresponding to the LU number of the PKG-SS command to "0".

In addition, the FM controller 412 invalidates all the SS data related to the target LU (S1805). Specifically, the FM controller 412 identifies all the logical-physical entries corresponding to the target LU in the logical-physical conversion table 1020, and invalidates all the generation management entry relationships in the identified multiple logical-physical entries. Furthermore, the FM controller 412 identifies the physical page number registered in the generation management entry for each invalidated generation management entry, and, in addition, changes the physical page status 1502 inside the entry comprising the identified physical page number (the entry in the physical page status management table 1040) from "SS" to "invalid" (S1806).

A case in which the PKG-SS command type is a SS acquisition will be explained below.

In a case where the SS command type is determined to be a SS acquisition in S1802, the FM controller 412 also makes a determination as to whether or not the snap shot flag is ON (S1807).

In a case where the result of the determination is that the snap shot flag is ON, the FM controller 412 carries out processing to raise the snap shot flag (S1808). Specifically, the FM controller 412 changes the snap shot flag 902 of the snap shot management table 1010 corresponding to the target LU to "ON".

Next, the FM controller 412 increments by 1 the snap shot acquisition value 1104 in the snap shot management table 1010 corresponding to the target LU (S1809). That is, the number of snap shots of the target LU increase by 1 each time a PKG-SS acquisition command is received.

A case in which the PKG-SS command type is a SS read will be explained hereinbelow.

In a case where the PKG-SS command type is determined to be a SS read in S1802, the FM controller 412 acquires the generation number from the PKG-SS command (S1811).

The FM controller 412 acquires the second logical address from the PKG-SS command, computes the logical page number based on this second logical address, and identifies the physical page corresponding to this logical page from the logical-physical conversion table 1020 (S1812).

The FM controller 412 determines whether or not there is a generation management entry comprising the generation number identified in S1811 in the logical-physical entry corresponding to the physical page identified in S1812 (S1813).

In a case where a generation management entry does not exist in S1813, the FM controller 412 reads data from the physical page identified in S1812 (S1814).

In a case where a generation management entry does exist in S1813, the FM controller 412 reads data from the physical page corresponding to the physical page number of this generation management entry (S1815).

The FM controller 412 sends the data read in either S1814 or S1815 to the storage controller 110. The storage controller 110 sends this data to the host apparatus 2. In accordance with this, the host apparatus 2 is able to acquire data corresponding to the first logical address specified by this SS command in the SS command-specified generation snap shot.

Figure 19:
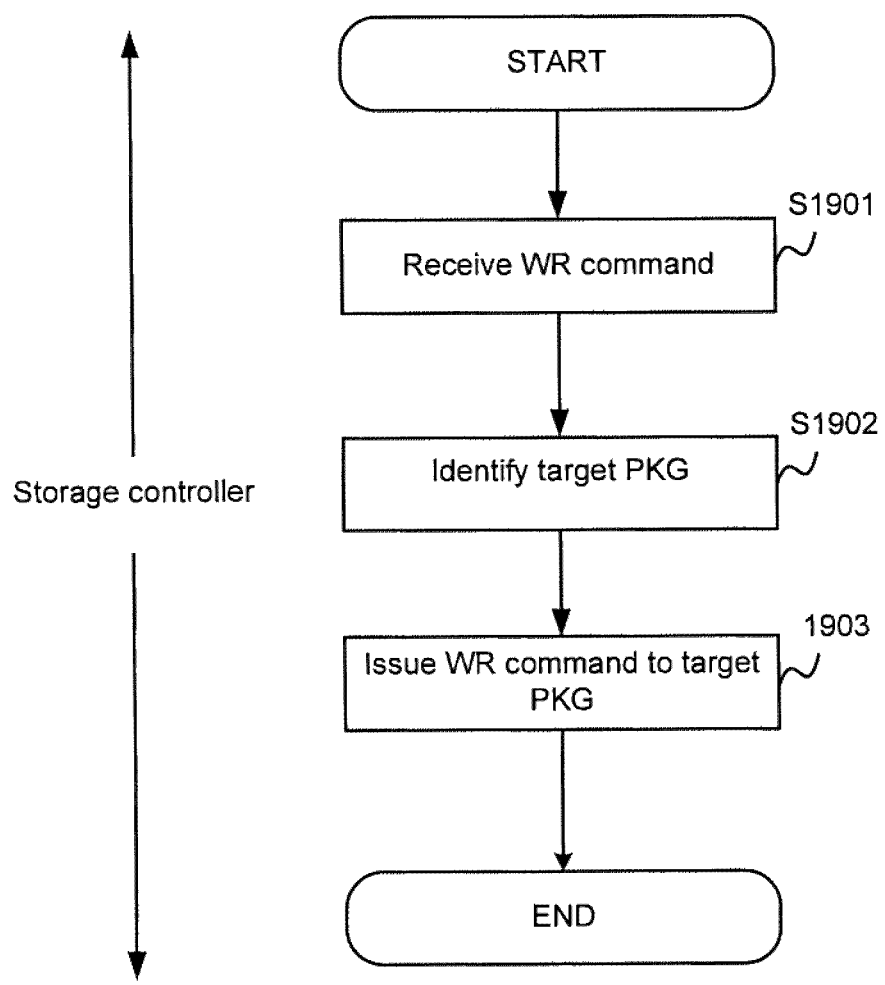
FIG. 19 is a flowchart showing a storage controller 110 write process.

FIG. 19 shows a storage controller 110 write process.

The storage controller 110 receives a write command and write-target data from the host apparatus 2 (S1901). Information denoting the write destination, for example, information comprising a LU number and a first logical address is included in the received write command.

The storage controller 110 identifies a write-destination FM package from the write command (S1902). Specifically, the storage controller 110 computes a second logical address from the LU number and the first logical address of the write command, and identifies the FM package corresponding to the LU number and this second logical address from the LU configuration table 620. This FM package is the write-destination FM package.

The storage controller 110 issues the write command and the write-target data to the write-destination FM package identified in S1902 (hereinafter, this write command will be called the PKG-WR command) (S1903). A LU number and a second logical address, for example, are included in the PKG-WR command. The LU number may be the same as the LU number of the write command.

Figure 20:
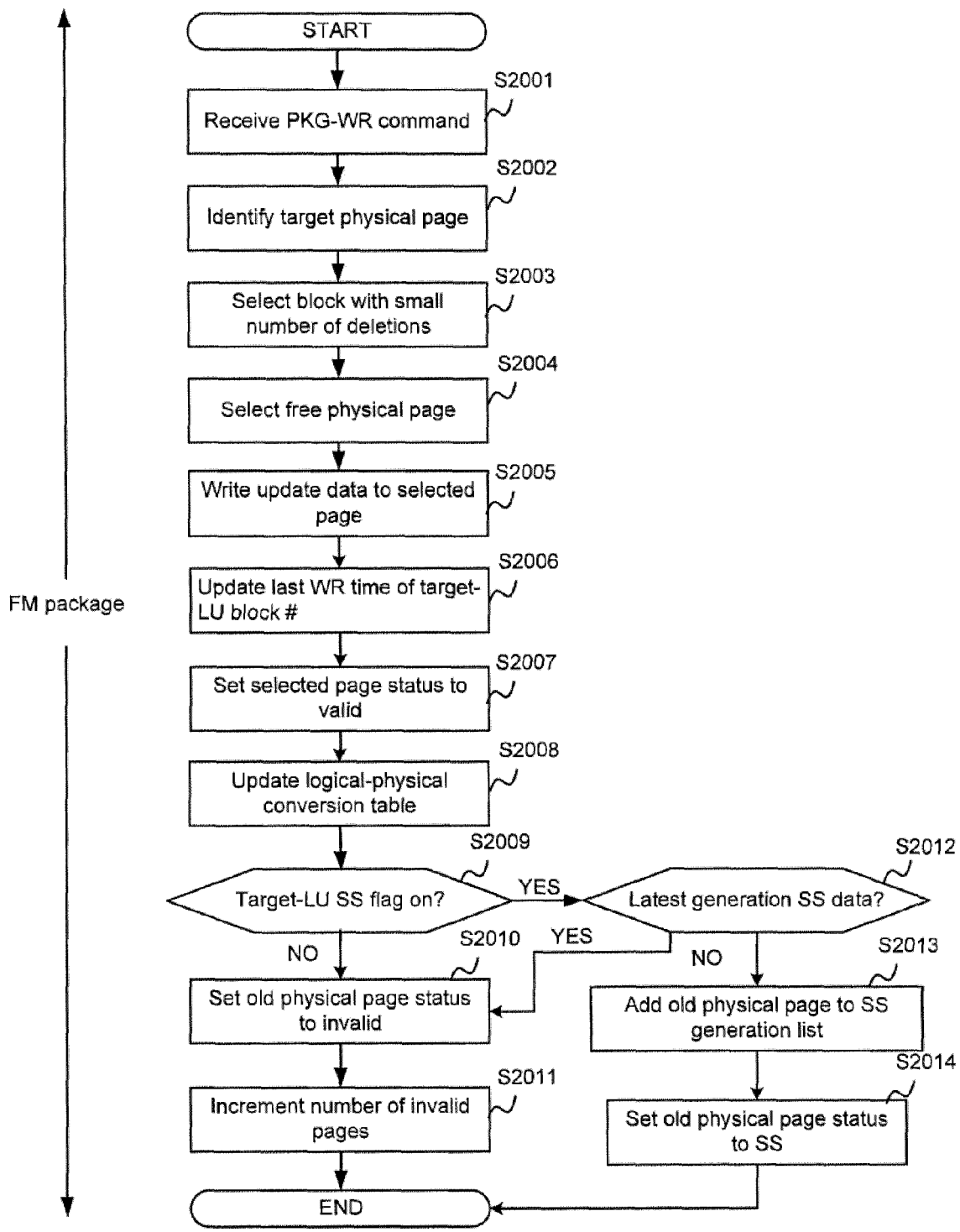
FIG. 20 is a flowchart showing a FM package 120 write process.

FIG. 20 shows a FM package 120 write process.

The FM package 120 receives a PKG-WR command from the storage controller 110 (S2001).

The FM controller 412 identifies a write-destination physical page from the received PKG-WR command (S2002). Specifically, the FM controller 412 computes a logical page number from a LU number and a second logical address included in the PKG-WR command. Then, the FM controller 412 identifies the physical page number corresponding to this logical page number from the logical-physical conversion table 1020. In a case where a physical page does not correspond to the target logical page number, information to this effect may be acquired in place of the physical page number.

The FM controller 412 selects a physical block with a small number of deletions (S2003). For example, the FM controller 412 selects the physical block with the minimum number of deletions based on the physical block status management table 150. Furthermore, for example, the FM controller 412 may arbitrarily select a physical block with a number of deletions that is equal to or less than a prescribed value. A selected physical block will be called the selected block hereinafter.

The FM controller 412 selects a free physical page from the multiple physical pages inside the selected block (S2004). Specifically, the FM controller 412, based on the physical block status management table 150, acquires the physical page numbers of the physical pages that exist inside the selected block. Then, the FM controller 412, based on the physical page status management table 140, selects from among these physical page numbers the physical page number having a physical page status 1502 of "free". The selected physical page will be called the selected page hereinafter.

The FM controller 412 writes the write-target data to the selected page (S2005).

The FM controller 412 updates the last WR time (S2006). Specifically, the FM controller 412, based on an internal timer (not shown in the drawing), acquires the time at which the write-target data was written to the selected page in S2005. Then, the FM controller 412 writes the acquired time to the last WR time column 1603 with respect to the selected block (the physical block 1601) of the physical block status management table 1050.

The FM controller 412 changes the physical page status 1502 in the physical page status management table 1040 corresponding to the selected page to "valid" (S2007).

The FM controller 412 updates the physical page number of the logical-physical conversion table 1020 (S2008). Specifically, the FM controller 412 changes the physical page number 1202 in the logical-physical conversion table 1020 corresponding to the logical page number computed in S2002 to the physical page number of the selected page. In the explanation of FIG. 20 below, the physical page number of prior to being changed to the physical page number of the selected page will be called the "old physical page number".

The FM controller 412 makes a determination as to whether or not the snap shot flag 1103 of the snap shot management table 1010 corresponding to the write-destination LU is "ON" (S2009). In a case where the snap shot flag 1103 is "OFF", the FM controller 412 moves to S2010. Alternatively, in a case where the snap shot flag 1103 is "ON", the FM controller 412 moves to S2012.

A case in which the snapshot flag 1103 is "OFF" will be explained. The FM controller 412, in a case where the snap shot flag 1103 corresponding to the target LU number 1101 in the snap shot management table 1010 is "OFF", changes the physical page status 1502 in the physical page status management table 1040 corresponding to the old physical page number to "invalid" (S2010).

Next, the FM controller 412 increments the number of invalid pages 1604 in the physical block status management table 1050 with respect to the selected block (S2011). The number of invalid pages 1604 is incremented in proportion to the number of pages configured as "invalid" in S2010.

A case in which the snap shot flag 1103 is "ON" will be explained. The FM controller 412, in a case where the snap shot flag 1103 in the snap shot management table 1010 corresponding to the write-destination LU is "ON", determines whether or not the latest generation of SS data exists for the write-destination LU (S2012). A case where the latest generation of SS data does not exist is one in which a generation management entry comprising the number of the latest generation is not related to the logical-physical entry comprising the logical page number computed in S2002. Alternatively, a case where the latest generation of SS data does exist is one in which a generation management entry comprising the number of the latest generation is related to the logical-physical entry comprising the logical page number computed in S2002. In a case where the latest generation of the SS data does not exist, the FM controller 412 proceeds to S2013. In a case where the latest generation of the SS data does exist, the FM controller 412 carries out the processing of S2010 through S2011 described above, and ends the processing.

The processing of S2013 will be explained. The FM controller 412 relates the generation management entry 1030 comprising the old physical page number and the latest generation number anew to the logical-physical entry comprising the logical page number computed in S2002 (S2013).

The FM controller 412 changes the physical page status 1502 in the physical page status management table 1040 corresponding to the old physical page number to "invalid" (S2014).

Figure 21:
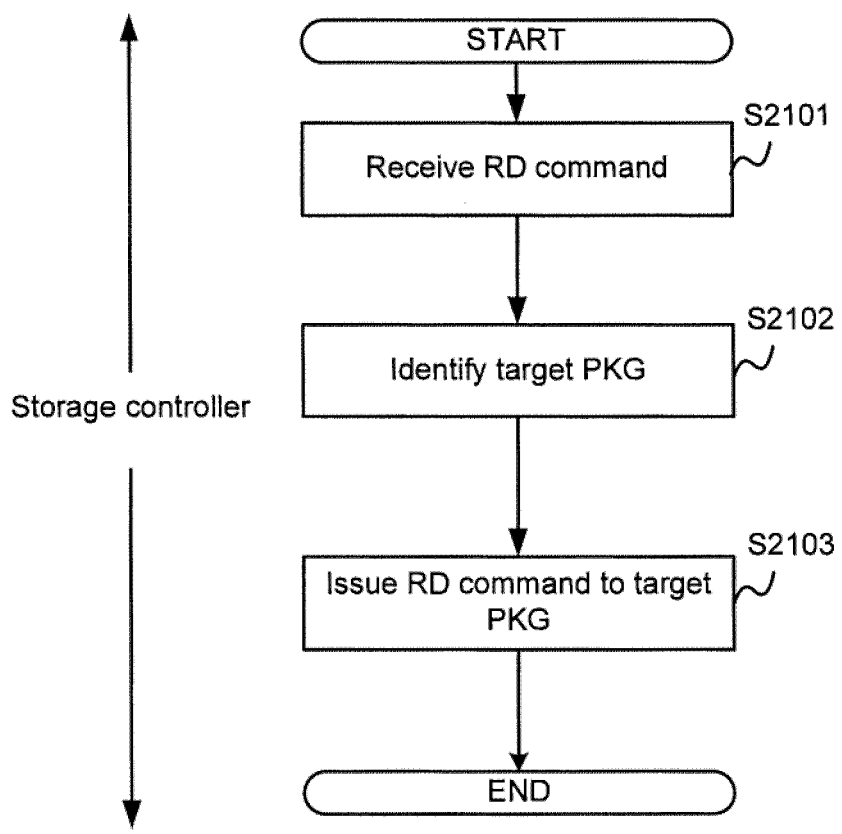
FIG. 21 is a flowchart showing a storage controller 110 read process.

FIG. 21 shows a storage controller 110 read process.

The storage controller 110 receives a read command from the host apparatus 2 (S2101). Information comprising a LU number and a first logical address, for example, is included in the received read command as information denoting the read source.

The storage controller 110 identifies the read-source FM package from the read command (S2102). Specifically, the storage controller 110 computes a second logical address from the LU number and the first logical address of the read command, and identifies the FM package corresponding to the LU number and this second logical address from the LU configuration table 620. This FM package is the read-source FM package.

The storage controller 110 issues the read command to the read-source FM package identified in S2102 (hereinafter, this read command will be called the PKG-RD command) (S2103). A LU number and a second logical address, for example, are included in the PKG-RD command. The LU number may be the same as the LU number of the read command.

Figure 22:
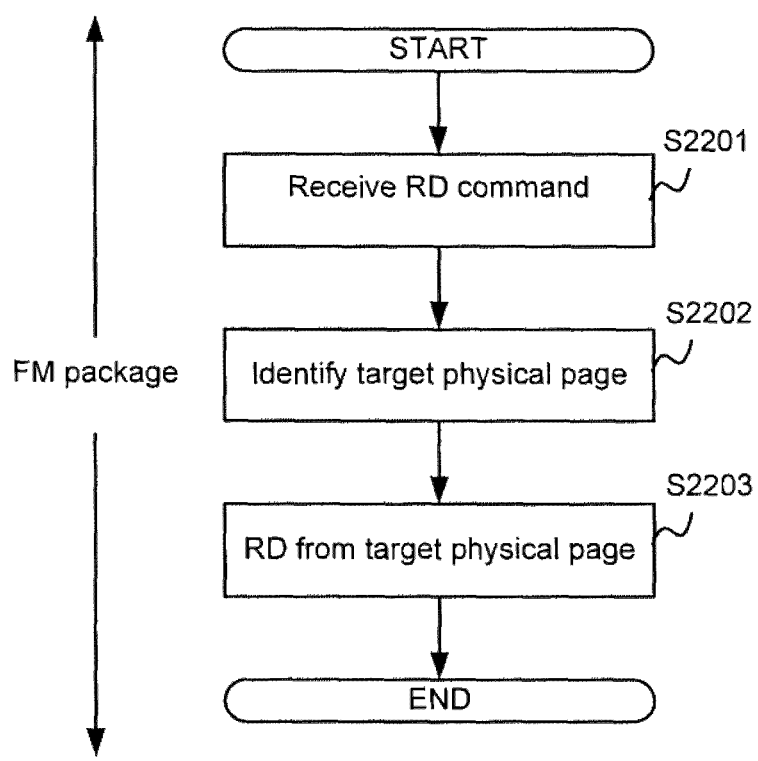
FIG. 22 is a flowchart showing a FM packager 120 read process.

FIG. 22 shows a FM package 120 read process.

The FM package 120 receives a PKG-RD command from the storage controller 110 (S2201).

The FM controller 412 identifies the read-source physical page from the received PKG-RD command (S2202). Specifically, the FM controller 412 computes the logical page number from the LU number and the second logical address included in the PKG-RD command. Then, the FM controller 412 identifies the physical page number corresponding to the computer logical page number from the logical-physical conversion table 1020.

The FM controller 412 reads data from the identified physical page (S2203).

The FM controller 412 sends the read data to the storage controller 110. The storage controller 110 sends this data to the host apparatus 2. In accordance with this, the host apparatus 2 is able to acquire data corresponding to the first logical address specified by the read command in the LU specified by this read command.

Figure 23:
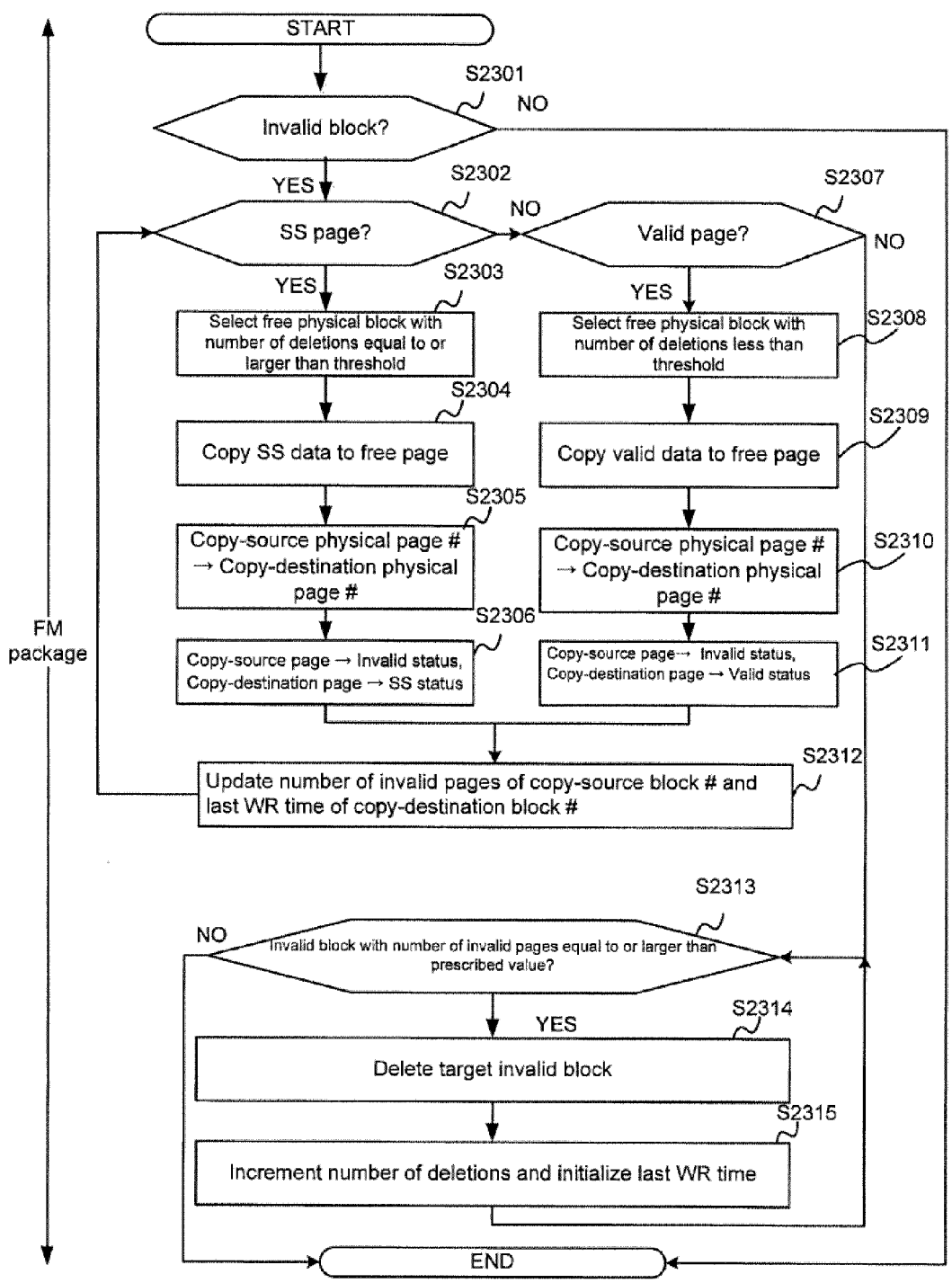
FIG. 23 is a flowchart showing the reclamation process.

Next, the reclamation process will be explained by referring to FIG. 23. The reclamation process is carried out by the FM package 412.

The FM controller 412 determines whether or not there is a physical block with invalid pages equal to or larger than a threshold with respect to each physical block 511 in the FM package 120 (S2301). Specifically, the FM controller 412 selects the physical block number 1401 of a physical block with a number of invalid pages 1604 equal to or larger than a threshold (in this explanation, a physical block with invalid pages equal to or greater than a threshold will be called the invalid block) based on the physical block status management table 1050. In a case where the result of the determination is that an invalid block does not exist, the FM controller 412 ends the reclamation process (END).

Alternatively, in a case where the result of the determination of S2301 is that an invalid block does exist in the FM package 120, the FM controller 412 carries out the processing of S2302 and the subsequent steps. In the following explanation, the processing of S2302 and subsequent steps will be explained with respect to one invalid block. However, in a case where multiple invalid blocks exist, the FM controller 412 may carry out the processing of S2302 and subsequent steps with respect to the invalid block that was detected first from the physical block status management table 1050, or may carry out this processing based on a prescribed rule, such as carrying out the processing of S2302 and subsequent steps beginning with the smallest physical block number.

The FM controller 412 makes a determination as to whether or not a SS page exists in the invalid block (S2302). Specifically, the FM controller 412, based on the physical block status management table 1050, selects a physical page list 1605 corresponding to the physical block number 1601 of the invalid block. Then, the FM controller 412, based on the physical page status management table 1040, makes a determination as to whether or not the physical page status 1502 with respect to the selected physical page is "SS". In a case where there is a physical page with a physical page status 1502 of "SS", the FM controller 412 moves to S2303. Alternatively, in a case where there a physical page with a physical page status 1502 of "SS" does not exist, the FM controller 412 moves to S2307.

S2303 will be explained. The FM controller 412 selects a physical block, which has a number of deletions that is equal to or larger than a threshold, and, in addition, comprises a free page (S2303). In the explanation of this processing, the physical block selected in S2303 will be called the first selected block. Specifically, the FM controller 412, based on the physical block status management table 1050, selects a physical block number 1601 with a number of deletions 1602 that is equal to or larger than a threshold, and acquires a physical page list 1605 corresponding to the selected physical block number 1601. Then, the FM controller 412, based on the physical page status management table 1040, searches whether or not the physical page status 1502 of the acquired physical page number 1501 is "free". In a case where the result of the search is that the physical page status 1502 is "free", the FM controller 412 selects the invalid page comprising this physical page as the first selected block. Furthermore, in a case where there are multiple physical blocks constituting the candidates for the first selected block, for example, the physical block with the most free pages may be used as the first selected block, or the physical block for which the number of deletions falls within a prescribed range may be used as the first selected block.

The FM controller 412 copies the data of the SS page (the SS data) in the invalid block to a free page of the first selected block (S2304). Hereinafter, the copy-source SS page in the invalid block will be called the copy-source page, and the copy-destination free page of the data in the first selected block will be called the copy-destination page.

The FM controller 412 changes the physical page number 1202 in the logical-physical conversion table 1020 corresponding to the copy-source page to the physical page number of the copy-destination page (S2305).

The FM controller 412 changes the physical page status 1502 corresponding to the physical page number 1501 of the copy-source page to "invalid", and changes the physical page status 1502 corresponding to the physical page number 1501 of the copy-destination page to "SS" in the physical page status management table 1040 (S2306).

The FM controller 412 updates the number of invalid pages of the invalid block and the last write time of the selected block (S2312). Specifically, first, the FM controller 412 increments the number of invalid pages 1604 corresponding to the physical block number 1601 of the invalid block in the physical [?block] status management table 1050. The incrementing of the number of invalid pages 1604 is carried out in proportion to the number of invalid pages. Next, the FM controller 412 updates the last write time 1603 corresponding to the physical block number 1601 of the selected block in the physical status management table 1050 to the time copied in S2304.

After the processing of S2312, in a case where the result of the determination of S2302 is that a physical page with the physical page status 1502 of "SS" does not exist in the physical page status management table 1040, S2307, which will be explained below, is carried out.

The FM controller 412 determines whether or not there is a valid page in the invalid block (S2307). Specifically, first the FM controller 412, based on the physical block status management table 1050, acquires the physical page list 1605 with respect to the physical block number 1601 of the invalid block. Next, the FM controller 412, based on the physical page status management table 1040, determines whether or not there is a physical page number 1501 with a selected physical page status 1502 of "valid". Ina case where a valid page exists in the invalid block, the FM controller 412 moves to S2308. In a case where a valid page does not exist in the invalid block, the FM controller 412 moves to S2313.

The processing of S2308 will be explained. The FM controller 412 selects a physical block, which has a number of deletions that is less than a threshold, and, in addition, comprises a free page (S2308). In the explanation of this process, the physical block selected in S2308 will be called the second selected block. Specifically, first the FM controller 412, based on the physical block status management table 1050, selects a physical block number 1601 with a number of deletions 1602 that is less than a threshold, and acquires the physical page list 1605 that corresponds to the selected physical block 1601. Then, the FM controller 412, based on the physical page status management table 1040, determines whether or not the physical page status 1502 of the acquired physical page number 1501 is "free". In a case where the result of this determination is affirmative, the FM controller 412 selects the invalid block comprising the physical page with the physical page status 1502 of "free" as the second selected block. Furthermore, in a case where multiple physical blocks constitute second selected block candidates, for example, the physical block with the most free pages may be selected as the second selected block, or the physical block with the lowest number of deletions may be selected as the second selected block.

The FM controller 412 copies the data of the valid page (the valid data) in the invalid block to a free page of the second selected block (S2309). Hereinafter, the copy-source valid page in the invalid block will be called the copy-source page, and the copy-destination free page of the data in the second selected block will be called the copy-destination page.

The FM controller 412 changes the physical page number 1202 of the logical-physical conversion table 1020 corresponding to the copy-source page to the physical page number of the copy-destination page (S2310).

The FM controller 412, with respect to the physical page status management table 1040, changes the physical page status 1502 corresponding to the copy-source page to "invalid", and changes the physical page status 1502 corresponding to the copy-destination page to "valid" (S2311).

The FM controller 412 carries out the processing of S2312 described hereinabove. That is, the FM controller 412 updates the number of invalid pages of the invalid block and the last write time of the selected block (S2312). After the processing of S2312, the processing of the above-described S2302 and subsequent steps is carried out.

Next, the processing of S2313 and subsequent steps will be explained.

In a case where the result of the determination in S2307 is that a valid page does not exist in the invalid block, the FM controller 412 determines whether or not there is an invalid block in which the number of invalid pages is equal to or larger than a prescribed value among the invalid blocks in the FM package 120 (S2313). Specifically, the FM controller 412, based on the physical block status management table 1050, determines whether or not there is a number of invalid pages 1604 that is equal to or larger than the prescribed value. In a case where the result of this determination is that an invalid block with a number of invalid pages that is equal to or larger than the prescribed value does not exist, processing ends (END).

Alternatively, in a case where the result of the determination is that an invalid block with a number of invalid pages that is equal to or larger than the prescribed value exists, the FM controller 412 acquires the physical block number 1601 of this invalid block. In a case where multiple invalid blocks with a number of invalid pages that is equal to or larger than the prescribed value exist, the FM controller 412 acquires the physical block number 1601 of the invalid block with the largest number of invalid pages of these invalid blocks. Hereinafter, the invalid block comprising the physical block number 1601 acquired in S2314 will be called the target invalid block.

The FM controller 412 deletes the target invalid block (S2314). The deletion of the invalid block refers to changing all of the physical pages in the invalid block to free physical pages.

The FM controller 412 increments by 1 the number of deletions of the target invalid block, and, in addition, initializes the last write time (S2315). Specifically, the FM controller 412 increments the number of deletions corresponding to the physical number 1601 of the target invalid block by 1 in the physical block status management table 1050, and initializes (for example, enters "-") the last write time.

Figure 24:
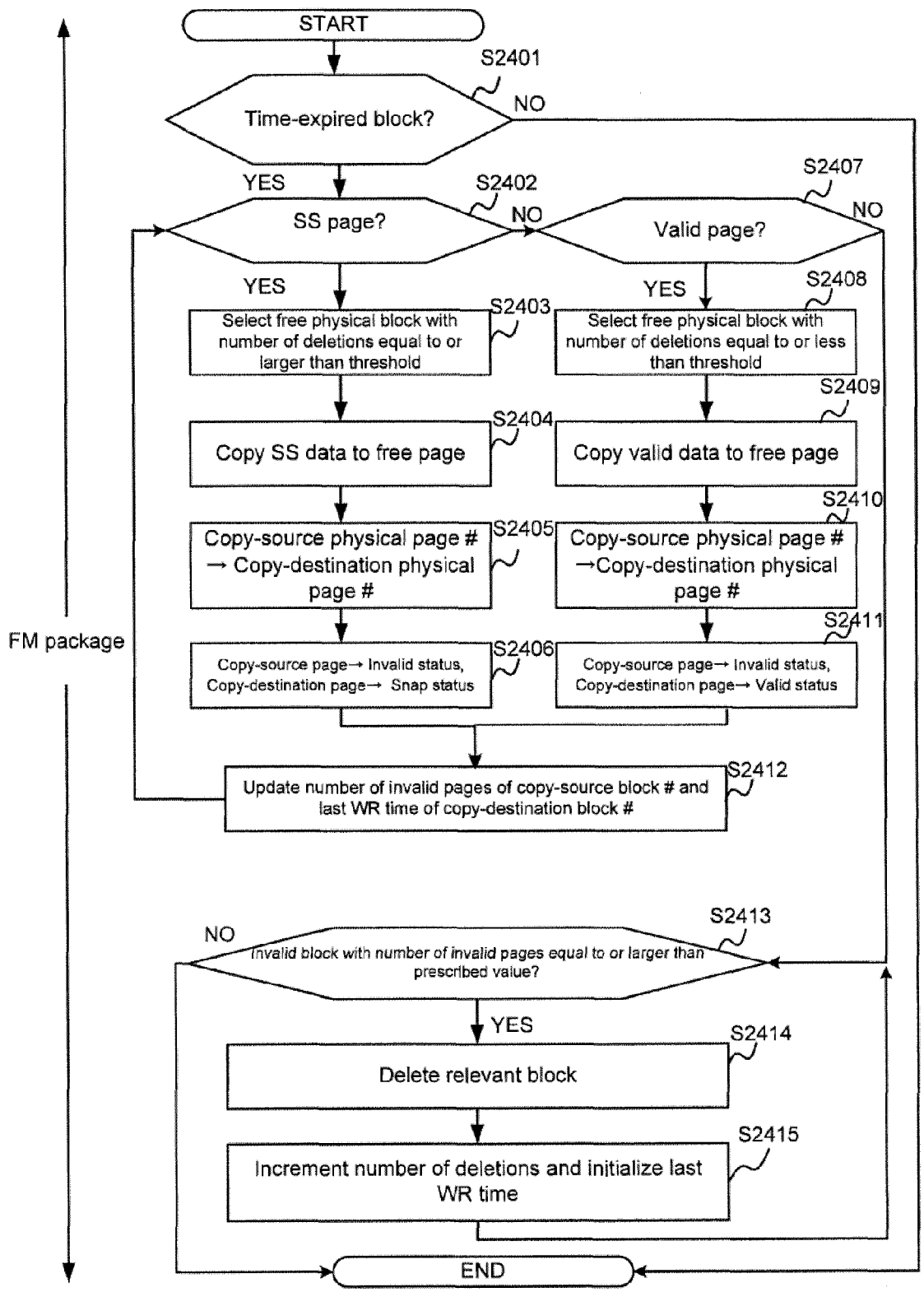
FIG. 24 is a flowchart showing the refresh process.

Next, the refresh process will be explained by referring to FIG. 24. The refresh process is carried out by the FM package 412.

The FM controller 412 determines whether or not there is a physical block with an elapsed time from the last write time that is equal to or longer than a threshold with respect to each physical block 511 in the FM package 120 (S2401). Specifically, the FM controller 412, based on the physical block status management table 1050, selects a physical block number 1401 of a physical block for which the difference between the current time and the last write time is equal to or larger than a threshold (in this explanation, a physical block for which the difference between the current time and the last write time is equal to or larger than a threshold will be called the time-expired block). In a case where the result of the determination is that a time-expired block does not exist, the FM controller 412 ends the refresh processing (END).

Alternatively, in a case where the result of the determination of S2401 is that a time-expired block exists in the FM package 120, the FM controller 412 carries out the processing of S2402 and subsequent steps. In the following explanation, the processing of S2402 and subsequent steps will be explained with respect to one time-expired block. However, in a case where there are multiple time-expired blocks, the FM controller 412 may carry out S2402 and subsequent steps with respect to the time-expired block initially found in the physical block status management table 1050, or may carry out the processing of S2042 and subsequent steps based on a prescribed rule beginning with the smallest physical block number.

The FM controller 412 makes a determination as to whether or not a SS page exists in the time-expired block (S2402). Specifically, the FM controller 412, based on the physical block status management table 1050, selects the physical page list 1605 that corresponds to the physical block number 1601 of the time-expired block. Then, the FM controller 412, based on the physical page status management table 1040, makes a determination as to whether or not the physical page status 1502 with respect to the selected physical page is "SS". In a case where a physical page with the physical page status 1502 "SS" exists, the FM controller 412 moves to S2403. Alternatively, in a case where a physical page with the physical page status 1502 "SS" does not exist, the FM controller 412 moves to S2407.

S2403 will be explained. The FM controller 412 selects a physical block, which has a number of deletions equal to or larger than a threshold, and, in addition, comprises a free page (S2403). In the explanation of this processing, the physical block selected in S2403 will be called the third selected block.

Specifically, first the FM controller 412, based on the physical block status management table 1050, selects the physical block number 1601 for which the number of deletions 1602 is equal to or larger than the threshold, and acquires the physical page list 1605 that corresponds to the selected physical block number 1601. Then, the FM controller 412, based on the physical page status management table 1040, searches whether or not the physical page status 1502 of the acquired physical page number 1501 is "free". In a case where the result of the search is that the physical page status 1502 is "free", the FM controller 412 selects the time-expired block comprising the physical page as a third selected block. Furthermore, in a case where there are multiple physical blocks constituting third selected block candidates, for example, the physical block with the most free pages may be the third selected block, or the physical block for which the number of deletions falls within a prescribed range may be the third selected block.

The FM controller 412 copies the data of the SS page (the SS data) in the time-expired block to the free page of the third selected block (S2404). Hereinafter, the copy-source SS page in the third selected block will be called the copy-source page, and the copy-destination free page in the third selected block will be called the copy-destination page.

The FM controller 412 changes the physical page number 1202 of the logical-physical conversion table 1020 corresponding to the copy-source page to the physical page number of the copy-destination page (S2405).

The FM controller 412 changes the physical page status 1502 corresponding to the copy-source page to "invalid" and changes the physical page status 1502 corresponding to the copy-destination page to "SS" in the physical page status management table 1040 (S2406).

The FM controller 412 updates the number of invalid pages of the third selected block and the last write time of the third selected block (S2412). Specifically, first the FM controller 412 increments the number of invalid pages 1604 corresponding to the third selected block in the physical status management table 1050. The incrementing of the number of invalid pages 1604 is carried out in proportion to the number of invalid pages. Next, the FM controller 412 updates the last write time 1603 corresponding to the third selected block in the physical status management table 1050 to the time at which the copy was carried out in S2404.

After the processing of S2412, in a case where the result of the determination of S2402 is that a physical page with the physical page status 1502 of "SS" does not exist in the physical page status management table 1040, S2407, which will be explained below, is carried out.

The FM controller 412 determines whether or not there is a valid page in the time-expired block (S2407). Specifically, first the FM controller 412, based on the physical block status management table 1050, acquires the physical page list 1605 with respect to the physical block number 1601 of the time-expired block. Next, the FM controller 412, based on the physical page status management table 1040, determines whether or not there is a physical page number 1501 with an acquired physical page status 1502 of "valid". In a case where a valid page exists in the time-expired block, the FM controller 412 moves to S2408. In a case where a valid page does not exist in the time-expired block, the FM controller 412 moves to S2413.

The processing of S2408 will be explained. The FM controller 412 selects a physical block, which has a number of deletions that is less than a threshold, and, in addition, comprises a free page (S2408). In the explanation of this process, the physical block selected in S2408 will be called the fourth selected block. Specifically, first the FM controller 412, based on the physical block status management table 1050, selects a physical block number 1601 with a number of deletions 1602 that is less than a threshold, and acquires the physical page list 1605 that corresponds to the selected physical block 1601. Then, the FM controller 412, based on the physical page status management table 1040, determines whether or not the physical page status 1502 of the acquired physical page number 1501 is "free". In a case where the result of this determination is affirmative, the FM controller 412 selects the time-expired block comprising the physical page with the physical page status 1502 of "free" as the fourth selected block. Furthermore, in a case where there are multiple physical blocks constituting fourth selected block candidates, for example, the physical block with the most free pages may be selected as the fourth selected block, or the physical block with the lowest number of deletions may be selected as the fourth selected block.

The FM controller 412 copies the data of the valid page (the valid data) in the time-expired block to the free page of the fourth selected block (S2409). Hereinafter, the copy-source valid page in the fourth selected block will be called the copy-source page, and the copy-destination free page of the data in the fourth selected block will be called the copy-destination page.

The FM controller 412 changes the physical page number 1202 of the logical-physical conversion table 1020 corresponding to the copy-source page to the physical page number of the copy-destination page (S2410).

The FM controller 412 changes the physical page status 1502 corresponding to the copy-source page to "invalid" and changes the physical page status 1502 corresponding to the copy-destination page to "valid" in the physical page status management table 1040 (S2411).

The FM controller 412 carries out the processing of S2412 described hereinabove. That is, the FM controller 412 updates the number of invalid pages of the fourth selected block and the last write time of the fourth selected block (S2412). After the processing of S2412, the processing of the above-described S2402 and subsequent steps is carried out.

Next, the processing of S2413 and subsequent steps will be explained.

In a case where the result of the determination in S2407 is that a valid page does not exist in the invalid block, the FM controller 412 determines whether or not there is a time-expired block in which the number of invalid pages is equal to or larger than a prescribed value among the time-expired blocks in the FM package 120 (S2413). Specifically, the FM controller 412, based on the physical block status management table 1050, determines whether or not there is a number of invalid pages 1604 that is equal to or larger than the prescribed value. In a case where the result of this determination is that a time-expired block with a number of invalid pages that is equal to or larger than the prescribed value does not exist, processing ends (END).

Alternatively, in a case where the result of the determination is that a time-expired block with a number of invalid pages that is equal to or larger than the prescribed value exists, the FM controller 412 acquires the physical block number 1601 of this time-expired block. In a case where multiple time-expired blocks with a number of invalid pages that is equal to or larger than the prescribed value exist, the physical block number 1601 of the time-expired block with the largest number of invalid pages of these time-expired blocks is acquired. Hereinafter, the time-expired block comprising the physical block number 1601 acquired in S2414 will be called the target time-expired block.

The FM controller 412 deletes the target time-expired block (S2414). The deletion of the time-expired block refers to changing all of the physical pages in the time-expired block to free physical pages.

The FM controller 412 increments by 1 the number of deletions of the target time-expired block, and, in addition, initializes the last write time (S2415). Specifically, the FM controller 412 increments the number of deletions corresponding to the physical number 1601 of the target time-expired block by 1 in the physical block status management table 1050, and initializes the last write time (for example, enters "-"). Then processing ends (END).

An embodiment of the present invention has been explained hereinabove, but this is an example for explaining the present invention and does not purport to limit the scope of the present invention solely to this embodiment. The present invention can be put into practice using various other modes as well.

REFERENCE SIGNS LIST

100 Storage system
110 Storage controller
120 FM package

The invention claimed is:

1. A flash package for a storage system having a storage controller which is coupled to a host apparatus, the flash package comprising:
   multiple flash memory chips; and
   a package controller configured to control the multiple flash memory chips,
   wherein the storage controller is configured to use a logical storage area provided by the package controller and a logical storage area provided by other one or more flash memory packages in the storage system to provide a first Logical Unit (LU) and a second LU to the host apparatus,
   wherein the first LU is managed as a backup target and the second LU is managed as a non-backup target, the package controller is configured to:
      upon receiving an update data write request with respect to a first logical storage area corresponding to the first LU, manage a first physical storage area allocated to the first logical storage area as a backup storage area in a state where pre-update data is maintained, newly allocate a second physical storage area to the first logical storage area, and write the update data to the second physical storage area,
      upon receiving an update data write request with respect to a second logical storage area corresponding to the second LU, manage a third physical storage area allocated to the second logical storage area as an invalid storage area, and write the update data to a fourth physical storage area newly allocated to the second logical storage area,
   wherein the package controller is configured to use the first physical storage area that is managed as the backup storage area to provide backup data for the first LU, and
   wherein the package controller is configured to delete pre-update data stored in the third physical storage area that is managed as the invalid storage area.

2. The flash package according to claim 1,
   wherein the package controller is configured to receive a backup acquisition request from the storage controller that has received the backup acquisition request with respect to the second LU from the host apparatus, and
   wherein the package controller, upon receiving the backup acquisition request with respect to the second LU, is configured to manage the second LU as the backup target.

3. The flash package according to claim 1,
   wherein the package controller is configured to receive a backup deletion request from the storage controller that has received the backup deletion request with respect to the first LU from the host apparatus, and
   wherein the package controller, upon receiving the backup deletion request with respect to the first LU, is configured to manage the first LU as the non-backup target and the first physical storage area as the invalid storage area.

4. The flash package according to claim 1,
   wherein the package controller is configured to perform a copy process, with respect to a first physical block,
   wherein the copy process includes:
      (a) a first copying to copy data, which is stored in at least one physical storage area allocated to a logical storage area corresponding to either the first LU or the second LU from among multiple physical storage areas included in the first physical block, to multiple physical storage areas included in a second physical block,
      (b) a second copying to copy data, which is stored in at least one physical storage area which is managed as the backup storage area from among multiple physical storage areas included in the first physical block, to multiple physical storage areas included in a third physical block, and
      (c) after the first and second copying is complete, deleting data stored in the multiple physical storage areas included in the first physical block.

5. The flash package according to claim 4,
   wherein the package controller is configured to:
      manage a number of deletions, which is the number of times that control for deleting data has been exercised with respect to each of multiple physical blocks of the multiple flash memory chips, and
      from among the multiple physical blocks, select a physical block with the number of deletions that is less than a threshold as the second physical block, and select a physical block with the number of deletions that is equal to or larger than a threshold as the third physical block.

6. The flash package according to claim 4, wherein the copy process is carried out when a ratio of physical storage areas which are managed as the invalid storage area from among the multiple physical storage areas included in the first physical block is equal to or larger than a threshold.

7. The flash package according to claim 4, wherein the copy process is carried out when a prescribed time has elapsed since the last time data is written to any of the multiple physical storage areas included in the first physical block.

8. A flash package, which is coupled to a higher level apparatus, comprising:
   a flash memory having multiple physical storage areas; and
   a package controller coupled to the flash memory and configured to provide a logical storage area to the higher level apparatus,
   wherein the package controller is configured to, upon receiving a write request of updating data that specifies a first logical storage area included in a backup target area in the logical storage area from the higher level apparatus, maintain allocation between the first logical storage area and a first physical storage area that stores a first pre-update data as a backup storage area, allocate a second physical storage area to the first logical storage area, and write the update data to the second physical storage area,
   wherein the package controller is configured to, upon receiving a write request of updating data that specifies a second logical storage area included in a non-backup target area in the logical storage area from the higher level apparatus, manage a third physical storage area that stores a second pre-update data and is allocated to the second logical storage area, as an invalid storage area, allocate a fourth physical storage area to the second logical storage area, and write the update data to the fourth physical storage area, wherein the package controller is configured to provide, to the higher level apparatus, the first pre-update data, as backup data, in the first physical storage area managed as the backup storage area, and wherein the package controller is configured to delete the second pre-update data in the third physical storage area managed as the invalid storage area.

9. The flash package according to claim 8, wherein the package controller is configured to, upon receiving a backup acquisition request that is a request for acquiring backup with respect to the second logical storage area from the higher level apparatus, manage the second logical storage area as a backup target area.

10. The flash package according to claim 8, wherein the package controller, upon receiving a backup deletion request that is a request for deleting backup with respect to the first logical storage area, manage the first logical storage area as a non-backup target area and manage the first physical storage area as an invalid storage area.

11. The flash package according to claim 8,
wherein the flash memory includes multiple physical blocks each comprising multiple physical storage areas,
wherein the package controller is configured to perform a copy process, with respect to a first physical block,
wherein the copy process includes:
  (a) a first copying to copy data, which is stored in all valid storage areas among physical areas other than a physical storage area managed as the backup storage area, to a second physical block, and to manage all the valid storage areas as each being an invalid storage area,
  (b) a second copying to copy data, which is stored in all backup storage areas among multiple physical storage areas included in the first physical block, to a third physical block and to manage all the backup storage areas as each being an invalid storage area, and
  (c) after the first and second copying is complete, deleting data stored in the first physical block.

12. The flash package according to claim 11,
wherein the package controller is configured to manage a number of deletions, which is the number of times that block deletion process for deleting data from physical blocks has been exercised with respect to each of the multiple physical blocks, and
wherein the package controller is configured to select a physical block, with the number of deletions that is less than a threshold as the second physical block, and select a physical block with the number of deletions that is equal to or larger than a threshold as the third physical block.

13. The flash package according to claim 11,
wherein the copy process is carried out when a ratio of physical storage areas which are managed as the invalid storage area from among the multiple physical storage areas included in the first physical block is equal to or larger than a threshold.

14. The flash package according to claim 11, wherein the copy process is carried out when a prescribed time has elapsed since the last time data is written to any of the multiple physical storage areas included in the first physical block.

15. The flash package according to claim 8,
wherein the higher level apparatus is a storage controller configured to provide a first Logical Unit (LU) that is a backup target and a second LU that is a non-backup target to one or more host devices,
wherein the first logical storage area is associated with the first LU, and
wherein the second logical storage area is associated with the second LU.

\* \* \* \* \*